(12) United States Patent
Hiraiwa et al.

(10) Patent No.: US 7,237,078 B2
(45) Date of Patent: Jun. 26, 2007

(54) REMOTE COPY SYSTEM

(75) Inventors: Yuri Hiraiwa, Sagamihara (JP); Nobuhiro Maki, Sagamihara (JP); Masahide Sato, Noda (JP); Katsuhisa Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 10/912,673

(22) Filed: Aug. 4, 2004

(65) Prior Publication Data
US 2005/0257015 A1 Nov. 17, 2005

(30) Foreign Application Priority Data
May 17, 2004 (JP) .............................. 2004-146038

(51) Int. Cl.
G06F 12/00 (2006.01)
(52) U.S. Cl. .................................................. 711/162
(58) Field of Classification Search ................. 711/162, 711/114, 112, 113
See application file for complete search history.

(56) References Cited

U.S. PATENT DOCUMENTS

| 5,544,347 | A | * | 8/1996 | Yanai et al. ................. 711/162 |
| 5,734,818 | A | * | 3/1998 | Kern et al. .................... 714/20 |
| 6,301,643 | B1 | | 10/2001 | Crockett et al. |
| 6,408,370 | B2 | | 6/2002 | Yamamoto et al. |
| 6,615,332 | B2 | * | 9/2003 | Yamamoto et al. ......... 711/167 |
| 6,745,303 | B2 | | 6/2004 | Watanabe |
| 6,859,824 | B1 | * | 2/2005 | Yamamoto et al. ......... 709/217 |
| 6,950,915 | B2 | * | 9/2005 | Ohno et al. .................. 711/162 |
| 7,076,621 | B2 | | 7/2006 | Ninose et al. |
| 2005/0033828 | A1 | * | 2/2005 | Watanabe .................... 709/219 |
| 2005/0050286 | A1 | | 3/2005 | Crowley et al. |

FOREIGN PATENT DOCUMENTS

JP 11-085408 3/1999

* cited by examiner

Primary Examiner—Reginald Bragdon
Assistant Examiner—Aracelis Ruiz
(74) Attorney, Agent, or Firm—Townsend and Townsend and Crew LLP

(57) ABSTRACT

The computer system comprises a first and second computer, at least one first storage system connected to the first computer, and a plurality of second storage systems connected to the second computer as well as being connected to the at least one first storage system. The first computer issues to the first storage system a normal write request and control-use write request stamped with issue time. A control-use write request is issued at periodic intervals. The first storage system receives a write request and transmits the write request as update-data to second storage system in such a way that the issue order is ascertainable. The second storage system receives the update-data and, responsive to a reflect instruction from the second computer, reflects the update-data in storage areas. The second computer acquires the issued times stamped on update-data received by the second storage systems, establishes a standard time on the basis of issue times, and instructs the plurality of second storage systems to reflect the update-data whose issue time is at or prior to the standard time in storage areas.

20 Claims, 14 Drawing Sheets

Fig.5

| SITE IDENTIFIER | PRODUCTION SITE |
|---|---|
| SUBSYSTEM IDENTIFIER | 100P1 |
| VOLUME IDENTIFIER | P11 |
|  | P12 |
|  | P13 |
| SUBSYSTEM IDENTIFIER | 100P2 |
| VOLUME IDENTIFIER | P21 |
|  | P22 |
|  | P23 |
| SITE IDENTIFIER | REMOTE SITE |
| SUBSYSTEM IDENTIFIER | 100R1 |
| VOLUME IDENTIFIER | R11 |
|  | R12 |
|  | R13 |
| SUBSYSTEM IDENTIFIER | 100R2 |
| VOLUME IDENTIFIER | R21 |
|  | R22 |
|  | R23 |

| PAIR NUMBER | COPY SOURCE VOLUME | | COPY DESTINATION VOLUME | |
|---|---|---|---|---|
| | STORAGE SUBSYSTEM IDENTIFIER | VOLUME IDENTIFIER | STORAGE SUBSYSTEM IDENTIFIER | VOLUME IDENTIFIER |
| Pr-11 | 100P1 | P11 | 100R1 | R11 |
| Pr-12 | 100P1 | P12 | 100R1 | R12 |
| Pr-13 | 100P1 | P13 | 100R1 | R13 |
| Pr-21 | 100P2 | P21 | 100R2 | R21 |
| Pr-22 | 100P2 | P22 | 100R2 | R22 |
| Pr-23 | 100P2 | P23 | 100R2 | R23 |

~34

| GROUP NUMBER | NUMBER OF PAIRS | PAIR NUMBER | RELATION INDICATOR FLAG |
|---|---|---|---|
| Gr-1 | 3 | Pr-11 | PRESENT |
|  |  | Pr-12 |  |
|  |  | Pr-13 |  |
| Gr-2 | 1 | Pr-21 | PRESENT |
| Gr-3 | 2 | Pr-22 | ABSENT |
|  |  | Pr-23 |  |

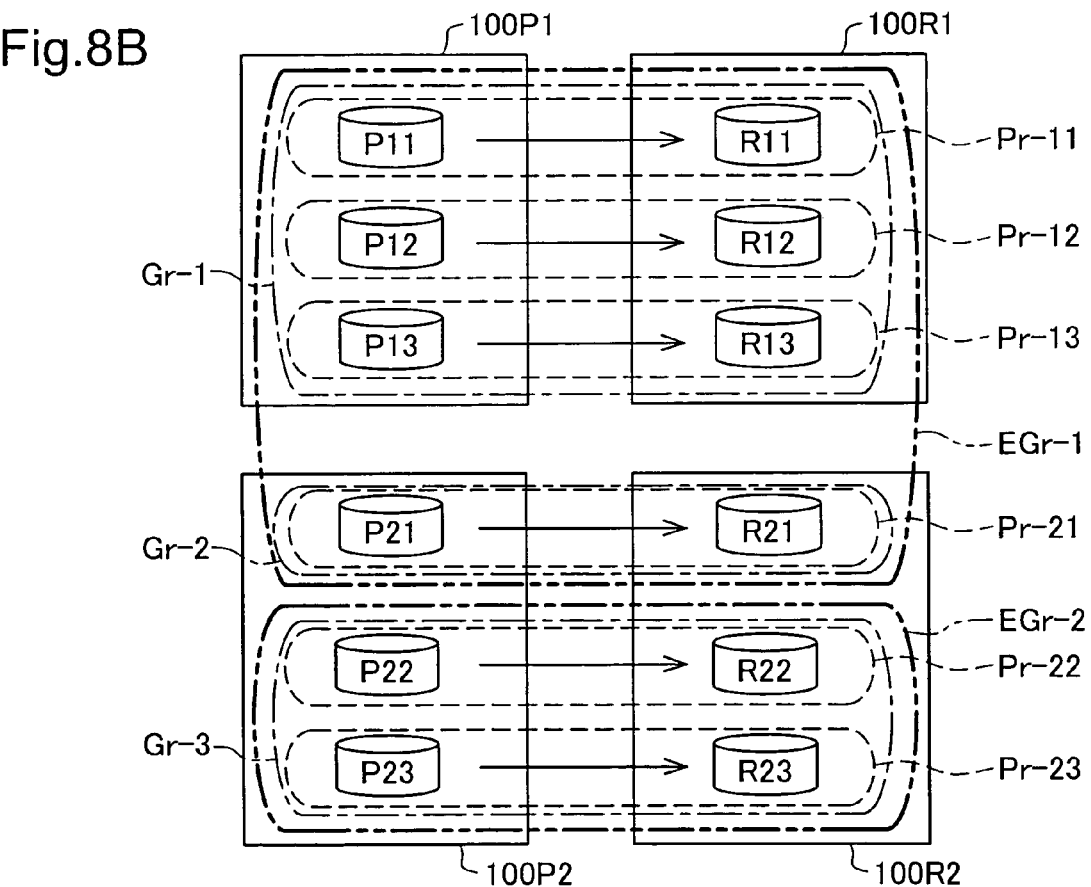

REMOTE COPY SYSTEM

BACKGROUND

The present invention relates to a computer system and control technique for same, and in particular to a technique for performing remote copying in a computer system that comprises a plurality of storage subsystems.

In recent years, in computer systems that comprise a host computer and a storage subsystem containing a storage area for storing data, a strong need to improve reliability of data has arisen. It has become common practice to use remote copy technology in order to improve data reliability in such computer systems. Remote copy technology is a technology wherein data is copied among a number of storage subsystems situated at different sites. According to remote copy technology, in the event that a malfunction occurs in a copy source storage subsystem (primary storage subsystem), rendering it inoperable, it is nevertheless possible to recover the data using data from a copy destination storage subsystem (secondary storage subsystem).

In the meanwhile, processes employing transactions are commonly carried out in computer systems. A transaction refers to a number of related processes that are treated as a single processing unit, such as a deposit/withdrawal process at a financial institution, for example. In a process employing a transaction, it is imperative to avoid situations in which an intermediate result of a transaction is left uncompleted, such as where a deposit process is carried out, but no corresponding withdrawal process is carried out, for example. In order to prevent intermediate results of transactions being left uncompleted, it is necessary for storage areas in storage subsystems to maintain states in which, of data write requests issued by the host computer, those write requests whose issue time is at or prior to a criterion in time are all reflected in storage areas, while those write requests whose issue time occurs subsequent to the criterion in time are all not reflected in storage areas. Here, reflection of a write request in a storage area refers to write data contained in the write request being stored in the storage area.

In computer systems that carry out remote copying, there is known a technique of controlling degradation in performance due to larger distances among storage subsystems, while at the same time preventing intermediate results of transactions from being left uncompleted (for example, JP11-85408A). According to this technique, a primary storage subsystem having received a data write request on which a issue time is stamped from the host computer sends completion information to the host computer immediately after receiving the write request. It is therefore possible to control degradation in performance due to larger distances among storage subsystems. The primary storage subsystem also sends the received write requests to secondary storage subsystems in the order of issue time, whereupon the secondary storage subsystems having received the transmitted write request reflect the write requests in their storage areas, in the order of the issue time stamp appended to write requests. Thus, in the storage areas of secondary storage subsystems, it is possible to maintain states in which, of data write requests issued by the host computer, those write requests whose issue time occurs prior to a criterion in time are all reflected in storage areas, while those write requests whose issue time is at or subsequent to the criterion in time are all not reflected in storage areas. It is accordingly possible to prevent intermediate results of transactions from being left uncompleted.

SUMMARY

However, in the above technique, the storage controller unit in any one secondary storage subsystem determines issue time appended to write requests, and reflects the write requests in the storage areas in the order of issue time. Accordingly, a resultant problem is that while it is possible to employ the above technique in order to prevent intermediate results of transactions from being left uncompleted in a computer system comprising a single secondary storage subsystem, it is difficult to employ it in order to prevent intermediate results of transactions from being left uncompleted in a computer system comprising a number of secondary storage subsystems.

In one aspect of the present invention, there is provided a computer system which comprises at least one first storage subsystem connected to a first computer, and a plurality of second storage subsystems connected to a second computer as well as being connected to the at least one first storage subsystem. The at least one first storage system and the plurality of second storage systems each comprise at least N (N is an integer equal to 2 or greater) storage areas for storing data. There are established N copy pairs composed of one storage area in the at least one first storage system and one storage area in the plurality of second storage systems. The first computer comprises a write request issuer. The write request issuer can issue a write request to the at least one first storage system. The write request is stamped with a issue time. The write request contains information indicating a storage area in the at least one first storage system. The write request includes a normal write request and a control-use write request. The normal write request requests that data be written to the indicated storage area. The control-use write request is issued at predetermined periodic intervals. The first storage system comprises a write request receiver, a write request processor and an update-data transmitter. The write request receiver can receive the issued write request. The write request processor can execute a process requested by the received write request. The update-data transmitter can transmit the received write request, as update-data, to the second storage system having a storage area that constitutes a copy pair with the storage area in the at least one first storage system indicated by the received write request, in such a way that the order in which the write requests are issued is ascertainable. The second storage system comprises an update-data receiver and an update-data processor. The update-data receiver can receive the transmitted update-data. The update-data processor can execute a process requested by the received update-data, in the event of an execute instruction from the second computer. The second computer comprises a time acquirer, a standard time setting module and an execute instructor. The time acquirer can acquire from the plurality of second storage systems the issue time stamped on the update-data received by the plurality of second storage systems. The standard time setting module can set a standard time on the basis of the acquired issue time. The execute instructor can instruct the plurality of second storage systems to execute a process requested by the update-data that, of the update-data received by the plurality of second storage systems, is stamped with the issue time prior to the standard time.

In this computer system, storage areas in the plurality of second storage subsystems are able to maintain states in which update-data (transferred write request) having issue time prior to the standard time is reflected in the storage areas, while update-data having an issue time subsequent to the standard time is not reflected in the storage areas. It is accordingly possible to prevent intermediate results of transactions from being left uncompleted, in a computer system composed of a plurality of secondary storage subsystems.

Further, in this computer system, the first computer issues write requests for control purposes at predetermined periodic intervals, control-use write requests so issued being received as update-data by the second storage subsystems in the same manner as normal write requests. Thus, it is possible to avoid a situation wherein, due to any of the plurality of second storage subsystems receiving no update-data for a prolonged period of time, the second computer cannot set a standard time, and an instruction to reflect update-data can no longer be output. Accordingly, in this computer system, it is possible to control delay in update-data (i.e. transferred write request) being reflected in storage areas of the second storage subsystems.

The present invention can be realized in various aspects. For example, the present invention can be realized in aspects such as a computer system, a computer, a storage subsystem, a storage method and device, a storage control method and device, a write request issuing method and device, a write request processing method and device, a computer program for realizing the functions of these methods or devices, a computer program set including such a computer program, a recording medium on which such a computer program is recorded, and a data signals in which such a computer program is realized in a carrier wave.

Where the invention is provided as a computer program or recording medium on which such a computer program is recorded, an arrangement whereby the program controls operation of the entire computer system is possible, as is an arrangement whereby the program controls operation of the computer and each storage subsystem.

The above and other objects, characterizing features, aspects and advantages of the present invention will be clear from the description of preferred embodiments presented below along with the attached drawings.

BRIEF DESCRIPTION OF THE DRAWINGS

FIG. 5 is an illustration of exemplary contents of system configuration information included in data duplication information.

FIGS. 8A and 8B illustrate exemplary contents of system extended group information included in data duplication information.

FIG. 9 is an illustration of exemplary contents of control-use write request issue information.

DESCRIPTION OF THE PREFERRED EMBODIMENT

Figure 1:
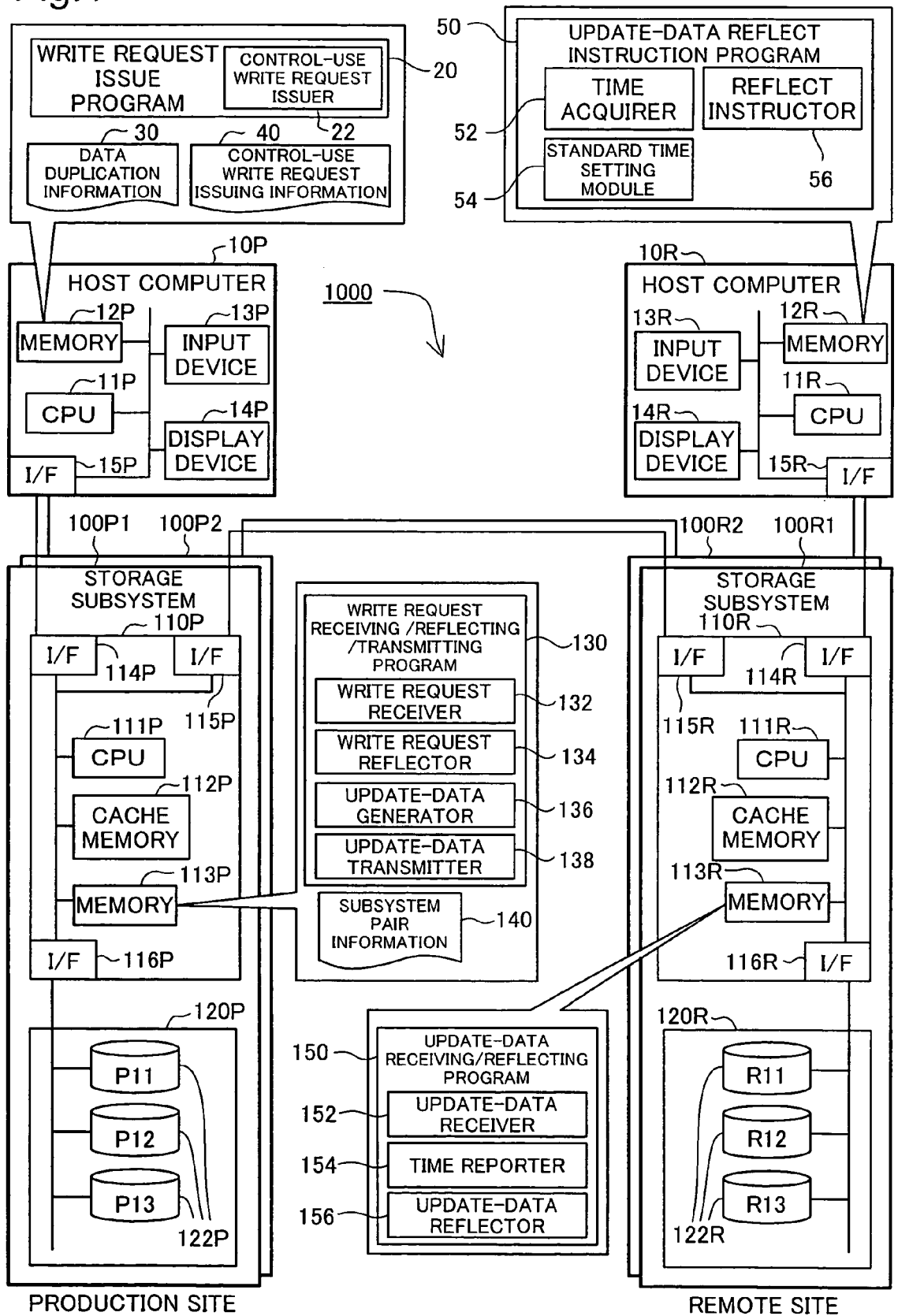
FIG. 1 is a block diagram showing arrangement of a computer system in Embodiment 1 of the invention.

The embodiment of the invention will be described in the following order.
A. Embodiment 1:
A-1. Arrangement of Computer System:
A-2. Control-use Write Request Issuing Process:
A-3. Write Request Receiving/Reflecting Process:
A-4. Update-data Transmitting Process:
A-5. Update-data Receiving Process:
A-6. Update-data Reflecting Process:
B. Embodiment 2:
C: Variations
   A. Embodiment 1:
   A-1. Arrangement of Computer System:

FIG. 1 is a block diagram showing arrangement of a computer system in Embodiment 1 of the invention. The computer system 1000 comprises a host computer 10P as a first computer, a host computer 10R as a second computer, and storage subsystems 100P1, 100P2, 100R1, and 100R2.

The host computer 10P and the storage subsystems 100P1 and 100P2 are situated at a production site at which data processing activities are carried out. The host computer 10R and the storage subsystems 100R1 and 100R2 are situated at a remote site away from the production site.

Herein, the host computer 10P at the production site will be referred to as "primary host computer 10P" and the storage subsystems 100P (100P1 and 100P2) at the production site as "primary storage subsystems 100P." The host computer 10R at the remote site will be referred to as "secondary host computer 10R" and the storage subsystems 100R (100R1 and 100R2) at the remote site as "secondary storage subsystems 100R."

The two primary storage subsystems 100P (100P1 and 100P2) located at the production site are each connected to the primary host computer 10P. The two secondary storage subsystems (100R1 and 100R2) at the remote site are each connected to the secondary host computer 10R. Primary storage subsystem 100P1 is connected to secondary storage subsystem 100R1, and primary storage subsystem 100P2 to secondary storage subsystem 100R, respectively.

With this computer system 1000, it is possible for host computer 10P to subject data stored in storage subsystems 100P at the production site to remote copying, in which the data is copied to secondary storage subsystems 100R at the remote site. By means of this remote copying, the same set of data can be held in two storage subsystems 100 situated at geographically remote locations, thereby making it possible to enhance reliability of the data.

Herein, symbols for the host computers and storage subsystems proper, and the constituent elements thereof, are suffixed by a symbol identifying the site where they are located. That is, symbols representing the elements are suffixed by a "P" symbol where present at a production site, or by an "R" symbol where present at a remote site. Storage subsystems 100 provided in pairs at each site have suffixes indicating a sequential number (1 or 2) for distinguishing each. In the description herein, where it is unnecessary to distinguish among individual host computers or among individual storage subsystems, the suffix symbols denoting site and the sequential numbers distinguishing storage subsystems within a given site are omitted from the symbols.

Primary host computer 10P located at the production site administers all of the storage subsystems in computer system 1000, and executes data processing services. For example, primary host computer 10P issues write requests to instruct that data be stored in primary storage subsystems 100P, or read requests to instruct that data stored in primary storage subsystems 100P be read out.

Secondary host computer 10R located at the remote site administers the secondary storage subsystems 100R located at the remote site. For example, secondary host computer 10R carries out data write instructions on secondary storage subsystems 100R.

Host computer 10 comprises a CPU 11, memory 12, input device 13, display device 14, and interface (I/F) 15 for connecting to storage subsystems 100.

Storage subsystem 100 is a system for storing data, outputting data, and so on in association with data processing services performed by host computer 10, and comprises a storage controller unit 110 and a disk array 120.

Storage controller unit 110 is a device for carrying out control of storage subsystem 100; for example, it receives a write request sent by a host computer and carries out control of data storage, or carries out transmission of a write request to other storage subsystems 100. Storage controller unit 110 comprises a CPU 111, cache memory 112, memory 113, an interface (I/F) 114 for connecting to host computer 10, an interface (I/F) 115 for connecting to other storage subsystems 100, and an interface (I/F) 116 for connecting to disk array 120.

Disk array 120 is a memory device employing a plurality of magnetic disk devices, and comprises at least one volume 122. Volume 122 is a storage area for storage of data that is used in data processing services by host computer 10. Ordinarily, a single logical storage area consisting of a plurality of magnetic disk devices is divided into a number of logical volumes 122.

In the memory 12P of primary host computer 10P are stored a write request issue program 20, data duplication information 30, and control-use write request issuing information 40.

Figure 2:
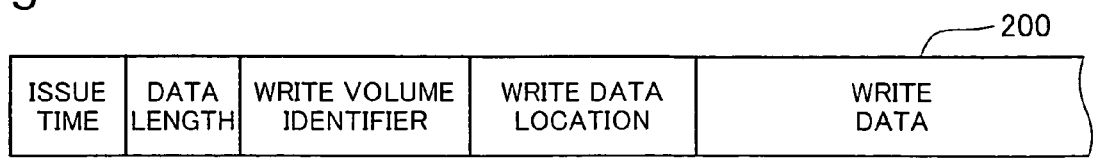
FIG. 2 is an illustration of exemplary contents of a write request.

Primary host computer 10P, by means of the CPU 11P reading the write request issue program 20 from memory 12P and executing it, issues write requests. FIG. 2 is an illustration of exemplary contents of a write request. Write request 200 includes an issue time by way of a time stamp indicating the time at which write request 200 is issued by primary host computer 10P; data length; a write request volume identifier for specifying a volume 122 to which data will be written; a write data location for specifying a data write location within volume 122; and write data for writing to volume 122. The primary host computer 10P issues a write request 200, and sends it to the primary storage subsystem 100P having the volume 122 specified by the write request volume identifier.

Figure 3:
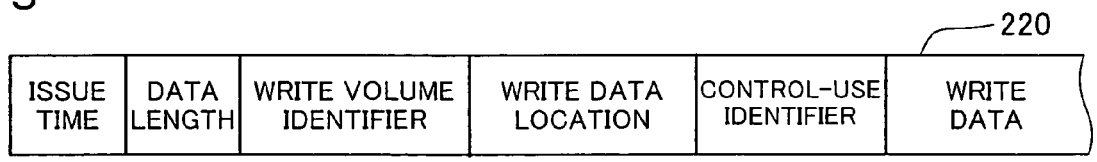
FIG. 3 is an illustration of exemplary contents of a control-use write request.

The write request issue program 20 (FIG. 1) has a control-use write request issuer 22 module; the primary host computer 10P is able to issue control-use write requests which are different from the normal write request 200 illustrated in FIG. 2. The purpose of a control-use write request is not to store data in volume 122, but is rather a write request issued for the purpose of controlling the timing for reflecting update-data in secondary storage subsystems 100R, described later; in other words, it is a "dummy" write request. FIG. 3 is an illustration of exemplary contents of a control-use write request. Control-use write request 220 contains, in addition to the content included in the normal write request 200 illustrated in FIG. 2, a control-use identifier indicating that the write request is for control purposes. Since the control-use write request is not intended to actually store data in volume 122, the write data consists of meaningless data (dummy data). Accordingly, this write data may be omitted.

Figure 4:
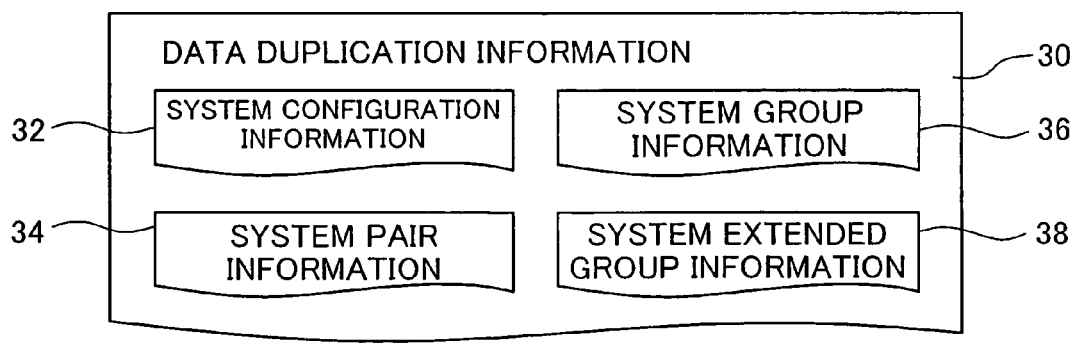
FIG. 4 is an illustration of exemplary contents of data duplication information.

Data duplication information 30 (FIG. 1) is information established for the purpose of duplicating data in computer system 1000. FIG. 4 is an illustration of exemplary contents of data duplication information. The data duplication information 30 includes system configuration information 32, system pair information 34, system group information 36, and system extended group information 38. Data duplication information 30 is created by the primary host computer 10P (FIG. 1), in accordance with administrator instructions input from input device 13P. Data duplication information 30 so generated is stored in a predetermined area in memory 12P.

FIG. 5 is an illustration of exemplary contents of system configuration information included in data duplication information. System configuration information 32 includes information that defines the configuration of storage subsystems 100 in computer system 1000. System configuration information 32 includes information that identifies, by means of a subsystem identifier, the storage subsystems 100 that are located at each site identified by a site identifier. System configuration information 32 includes information that identifies, by means of a volume identifier, a volume 122 stored within each storage subsystem 100. Herein, a volume 122 with a volume identifier X is simply referred to as "X volume." For example, the volume 122 whose identifier is P11 stored in primary storage subsystem 100P1 at the production site is referred to as the P11 volume.

Figures 6A, 6B:
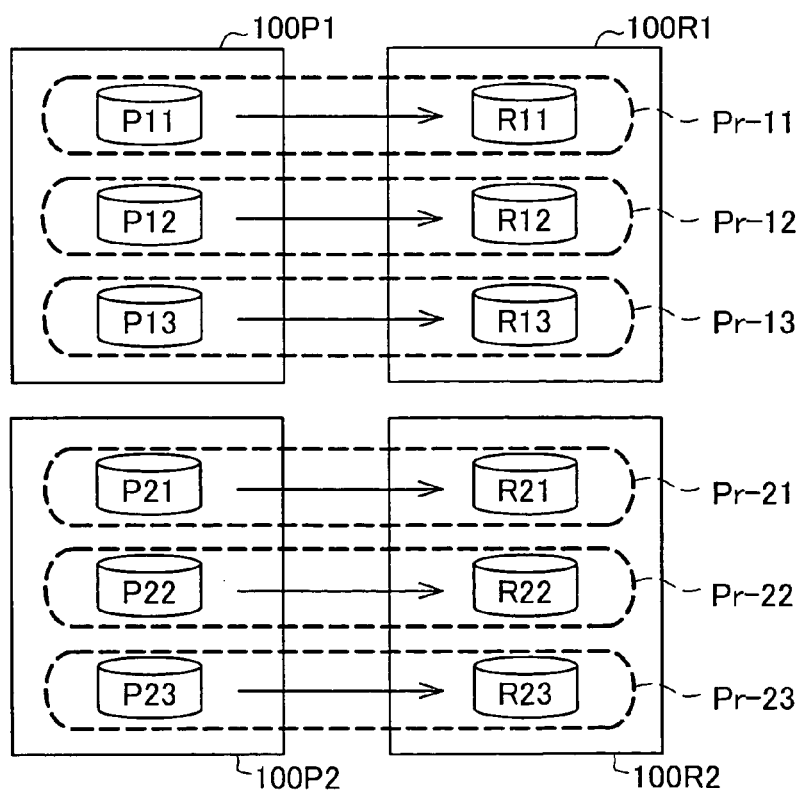
FIGS. 6A and 6B illustrate exemplary contents of system pair information included in data duplication information.

FIGS. 6A and 6B show exemplary contents of system pair information included in data duplication information. System pair information 34 includes copy pair information defining a copy pair which has been established in computer system 1000. Here, copy pair means a combination of two volumes 122 for copying data. That is, data stored in one of the volumes 122 making up a copy pair is copied to the other volume 122 of the pair. By executing copying of data within a copy pair, it is possible to create a state in which two sets of given data exist. Copy pair information means information that defines the two volumes 122 making up a copy pair, by means of storage subsystem identifiers and volume identifiers. It is possible for a copy pair to be composed of two volumes 122 that are stored in a single storage subsystem 100, or to be composed of two volumes 122 that are stored separately on two different storage subsystems 100.

In FIG. 6A is shown example content of system pair information 34. Each row of the system pair information 34 shown in FIG. 6A indicates two volumes 122, i.e. a copy source volume and a copy destination volume, each identified by a storage subsystem identifier and a volume identifier. That is, each row of system pair information 34 constitutes one set of copy pair information. For example, in the first row of system pair information 34 the copy pair of pair number Pr-11 is composed of a P11 volume and an R11 volume, indicating that data stored on the P11 volume is copied onto the R11 volume.

System pair information 34 includes copy pair information defining a copy pair in computer system 1000. In the computer system 1000, six copy pairs are defined by the six sets of copy pair information included in the system pair information 34 shown in FIG. 6A. In FIG. 6B, the six copy pairs (Pr-11 to Pr-23) defined in the system pair information 34 are shown enclosed by broken lines. The copy direction (i.e. direction from the copy source to copy destination) in each copy pair is indicated by an arrow.

Figures 7A, 7B:
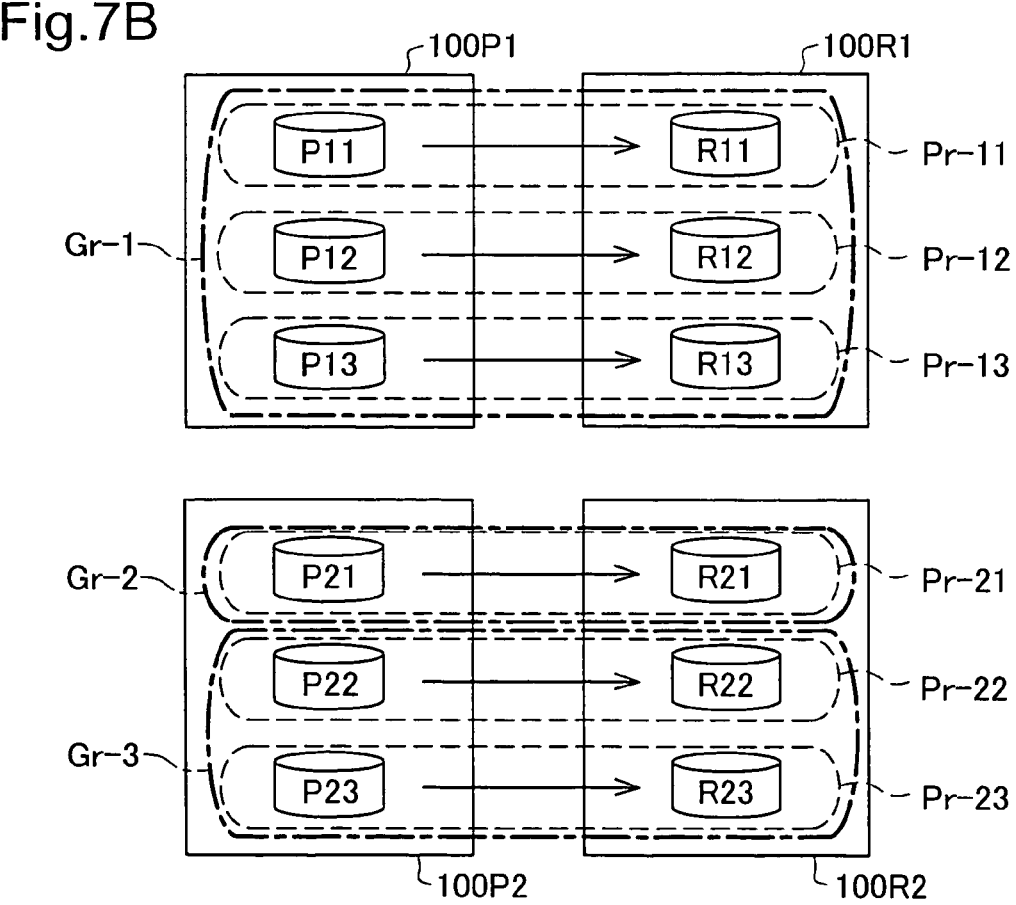
FIGS. 7A and 7B illustrate exemplary contents of system group information included in data duplication information.

FIGS. 7A and 7B show exemplary contents of system group information included in data duplication information. The system group information 36 includes copy group information defining a copy group established within computer system 1000.

The copy group will now be described. In the computer system 1000, when a write request is issued by primary host computer 10P (FIG. 1) to a primary storage subsystem 100P (FIG. 1), the write request is transferred to the secondary storage subsystem 100R having the volume 122 that, together with the volume 122 identified by the write request, constitutes a copy pair (a write request transferred in this manner is termed "update-data"), as will be described in greater detail later. The secondary storage subsystem 100R having received the update-data holds the update-data, and when presented with a reflect instruction specifying a standard time from the secondary host computer 10R, executes a process to reflect in volume 122 update-data whose issue time is at or prior to the standard time. A copy group is a set of one or more copy pairs including one or more volumes 122 within one secondary storage subsystem 100R, which have been set so that an update-data reflection processes are carried out using a same given standard time are carried out using a same given standard time.

An example of the contents of system group information 36 is shown in FIG. 7A. Each row of the system group information 36 shown in FIG. 7A shows a copy group made up of one or more copy pairs identified by pair numbers. That is, each row of system group information 36 constitutes one set of copy group information. For example, the first row of system group information 36 shows a copy group of group number Gr-1, composed of three copy pairs Pr-11, Pr-12 and Pr-13. This means that for three volumes 122, namely the R11 volume, R12 volume and R13 volume, of secondary storage subsystem 100R1 shown in FIG. 7B, settings have been made such that an update-data reflection processes are carried out using a same given standard time.

System group information 36 contains copy group information defining copy groups in computer system 1000. In the computer system 1000, three copy groups are defined by the three sets of copy group information included in the system group information 36 shown in FIG. 7A. In FIG. 7B, the three copy groups (Gr-1 to Gr-3) defined in the system group information 36 are shown enclosed by dot-and-dash lines. Relation indicator flags included in system group information 36 indicate whether a copy group, together with other copy groups, makes up an extended copy group, described later.

FIGS. 8A and 8B show exemplary contents of system extended group information included in data duplication information. The system extended copy group information 38 includes extended group information defining an extended copy group established within computer system 1000.

Here, an extended copy group is a set of one or more copy pairs including all volumes 122 within computer system 1000, which have been set so that update-data reflection processes are carried out using a same given standard time. Accordingly, an extended copy group is composed of one or more copy groups.

An example of the contents of system extended group information 38 is shown in FIG. 8A. Each row of the system extended group information 38 shown in FIG. 8A shows an extended copy group made up of one or more copy groups identified by group numbers. That is, each row of system extended group information 38 constitutes one extended copy group. For example, the first row of system extended group information 38 shows an extended copy group of extended copy group number EGr-1, composed of two copy groups Gr-1 and Gr-2. This means that for four volumes 122, namely the R11 volume, R12 volume and R13 volume of secondary storage subsystem 100R1 and the R21 volume of secondary storage subsystem 100R2 shown in FIG. 8B, settings have been made such that an update-data reflection processes are carried out using a same given standard time.

System extended group information 38 contains extended copy group information defining extended copy groups in computer system 1000. In the computer system 1000, two extended copy groups are defined by the two sets of extended copy group information included in the system group extended information 38 shown in FIG. 8A. In FIG. 8B, the two extended copy groups (EGr-1 and EGr-2) defined by the system extended group information 38 are shown enclosed by double dot-and-dash lines.

FIG. 9 is an illustration of exemplary contents of control-use write request issue information 40 (FIG. 1). The control-use write request issue information 40 contains information specifying an issue cycle for issuing control-use write requests by primary host computer 10P. In this embodiment, the issue cycle for control-use write requests is set on a per-extended copy group basis. In the example of FIG. 9, a control-use write request issue cycle of one second is established for extended copy group EGr-1, and one of 10 seconds for extended copy group GRr-2. Control-use write request issue information 40 is generated by primary host computer 10P (FIG. 1) according to administrator instructions input from input device 13P. The control-use write request issue information 40 so generated is stored in a predetermined area in memory 12P.

In memory 113P (FIG. 1) of primary storage subsystem 100P are stored a write request receiving/reflecting/transmitting program 130, and subsystem pair information 140.

By means of CPU 111P reading out and executing the write request receiving/reflecting/transmitting program 130 from memory 113P, primary storage subsystem 100P executes a write request receiving/reflecting process and an update-data transmitting process. Write request receiving/reflecting/transmitting program 130 has the modules of a write request receiver 132, a write request reflector 134, an update-data generator 136, and an update-data transmitter 138. The write request receiving/reflecting process and an update-data transmitting process by the primary storage subsystem 100P using these functions will be described later.

Subsystem pair information 140 (FIG. 1) contains copy pair information defining a copy pair such that at least one of the two volumes 122 making up the copy pair is a volume 122 in its own storage subsystem 100P. That is, a primary storage subsystem 100P has, as subsystem pair information 140, copy pair information defining all copy pairs in which its own volume 122 is included. For example, primary storage subsystem 100P1 has, as subsystem pair information 140, three sets of copy pair information defining the three copy pairs of pair numbers Pr-11, Pr-12, Pr-13 of FIG. 6A.

An update-data receiving/reflecting program 150 is stored in memory 113R (FIG. 1) of secondary storage subsystem 100R. By means of CPU 111R reading out and executing the update-data receiving/reflecting program 150 from memory 113R, secondary storage subsystem 100R executes an update-data receiving process, as well as executing an update-data reflecting process in cooperation with secondary host computer 10R. The update-data receiving/reflecting program 150 has the modules of an update-data receiver 152, a time reporter 154, and an update-data reflector 156. The update-data receiving/reflecting process by the secondary storage subsystem 100R using these functions will be described later.

An update-data reflect instruction program 50 is stored in memory 12R (FIG. 1) of secondary host computer 10R. By means of CPU 11R reading out and executing the update-data reflect instruction program 50 from memory 12R, secondary host computer 10R executes an update-data reflecting process in cooperation with secondary storage subsystem 100R. The update-data reflect instruction program 50 has the modules of a time acquirer 52, a standard time setting module 54, and a reflect instructor 56. The update-data reflecting process by the secondary host computer 10R using these functions will be described later.

Figure 10:
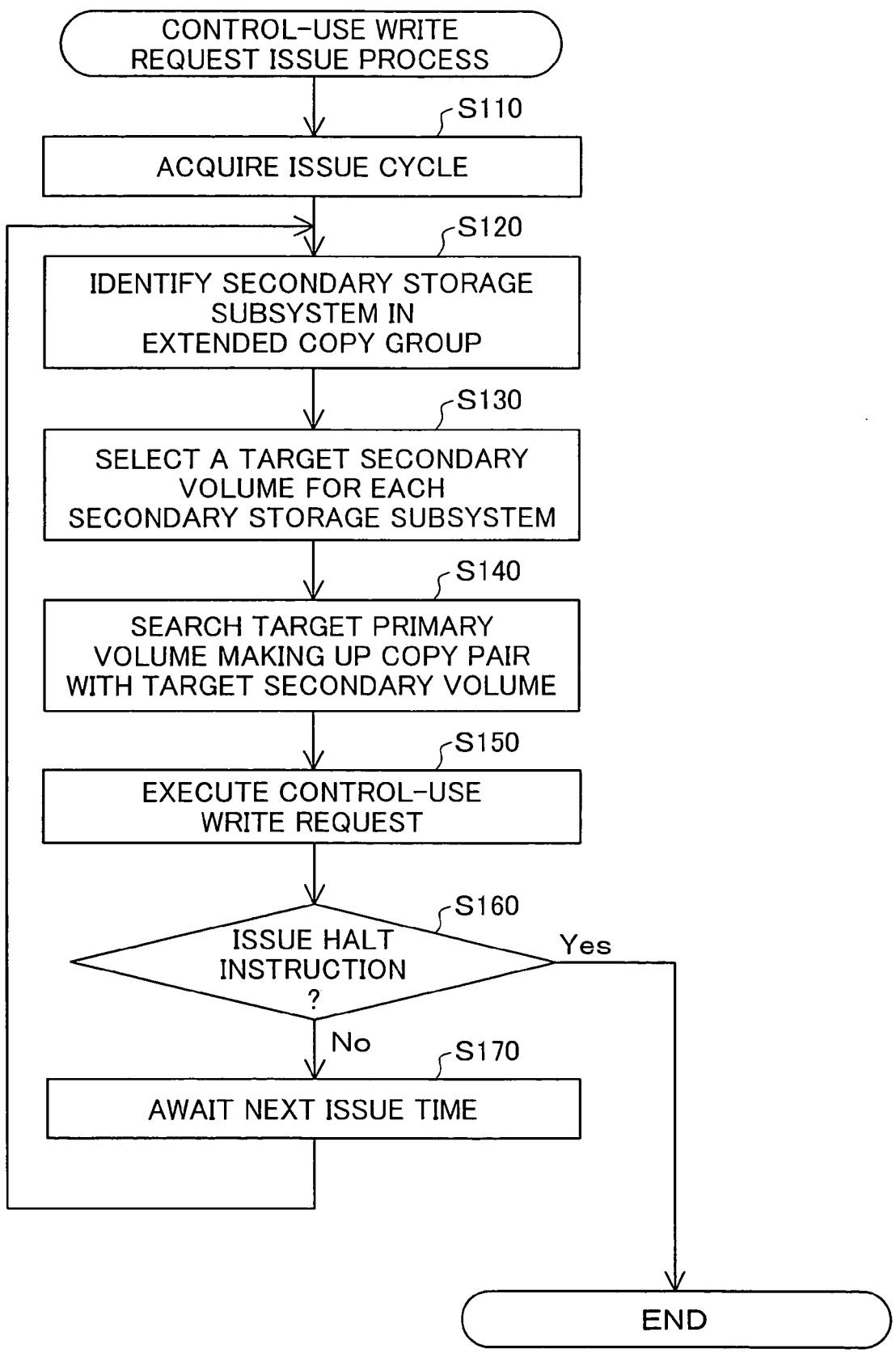
FIG. 10 is a flowchart showing the flow of a control-use write request issuing process by a primary host computer.

A-2. Control-Use Write Request Issuing Process:

FIG. 10 is a flowchart showing the flow of a control-use write request issuing process by a primary host computer. The control-use write request issuing process is a process that involves the primary host computer 10P executing a write request issue program 20 to issue to primary storage subsystems 100P control-use write requests having the content shown in FIG. 3. The control-use write request issuing process is executed in extended copy group units. In FIG. 10 is shown the flow of a control-use write request issuing process targeting a certain extended copy group.

In Step S110, control-use write request issuer 22 (FIG. 1) acquires an issue cycle for control-use write requests. The control-use write request issue cycle can be acquired by making reference to the control-use write request issue cycle information 40 (FIG. 9) stored in memory 12P (FIG. 1).

In Step S120 (FIG. 10), the control-use write request issuer 22 identifies secondary storage subsystems 100R included in the target extended copy group. Identification of secondary storage subsystems 100R can be carried out making reference to the data duplication information 30 (FIG. 4) stored in memory 12P (FIG. 1). For example where EGr-1 is the target extended copy group, as will be understood from FIG. 8B, secondary storage subsystems 100R1 and 100R2 are identified as secondary storage subsystems 100R included in the target extended copy group EGr-1.

In Step S130 (FIG. 10), the control-use write request issuer 22 selects, for each secondary storage subsystem 100R identified in Step S120, one volume 122 as a target secondary volume. For example, where EGr-1 is the target extended copy group, one volume (the R11 volume, for example) will be selected from among the three volumes 122 (R11 volume, R12 volume and R13 volume) as the target secondary volume in secondary storage subsystem 100R1. The R21 volume is selected as the target secondary volume in secondary storage subsystem 100R2.

In Step S140 the control-use write request issuer 22 searches within primary storage subsystems 100P for target primary volumes, which are volumes 122 that make up copy pairs with the respective target secondary volumes selected in Step S130. The target primary volume search can be carried out making reference to system pair information 34 (FIG. 6A) included in the data duplication information 30 stored in memory 12P (FIG. 1). For example, where the R11 volume and R21 volume have been selected as target secondary volumes, the P11 volume and P21 volume will be searched as target primary volumes.

In Step S150 (FIG. 10), the control-use write request issuer 22 identifies the target primary volumes searched in Step S140, and issues a control-use write request. That is, a control-use write request having the target primary volumes as the write request volume identifiers (FIG. 3) contained in the write request is issued to the primary storage subsystems 100P in which the target primary volumes are stored. For example, where the target primary volumes are the P11 volume and P21 volume, a write request whose write request volume identifier is P11 will be issued to primary storage subsystem 100P1, and a write request volume identifier is P21 will be issued to primary storage subsystem 100P2.

In Step S160 (FIG. 10), the control-use write request issuer 22 decides whether there is a control-use write request issuance halt instruction. If in Step S160 it is decided that there is such an instruction, the process is terminated. If on the other hand in Step S160 it is decided that there is no such instruction, the routine proceeds to Step S170. A control-use write request issuance halt instruction may be made through input of an instruction by the administrator from input device 13P.

In Step S170, the control-use write request issuer 22 awaits the next issue time. Subsequently, when the next issue time arrives, it returns to Step S120 and repeats the process described above.

In this way, primary host computer 10P issues control-use write requests. A control request is issued by selecting one volume 122 for each secondary storage subsystem 100R included in an extended copy group, and identifying the volume 122 in primary storage subsystem 100P that together with the selected volume 122 constitutes a copy pair. By so doing, a single control-use write request reaches each secondary storage subsystem 100R included in an extended copy group. In this embodiment, after first selecting target secondary volumes, target primary volumes, which are volumes 122 that together with the target secondary volumes constitute copy pairs, are searched. As will be shown in a variation described later, this is done in order that a single write request will reach each secondary storage subsystem 100R even where two secondary storage subsystems 100R are connected to a single primary storage subsystem 100P.

Figure 11:
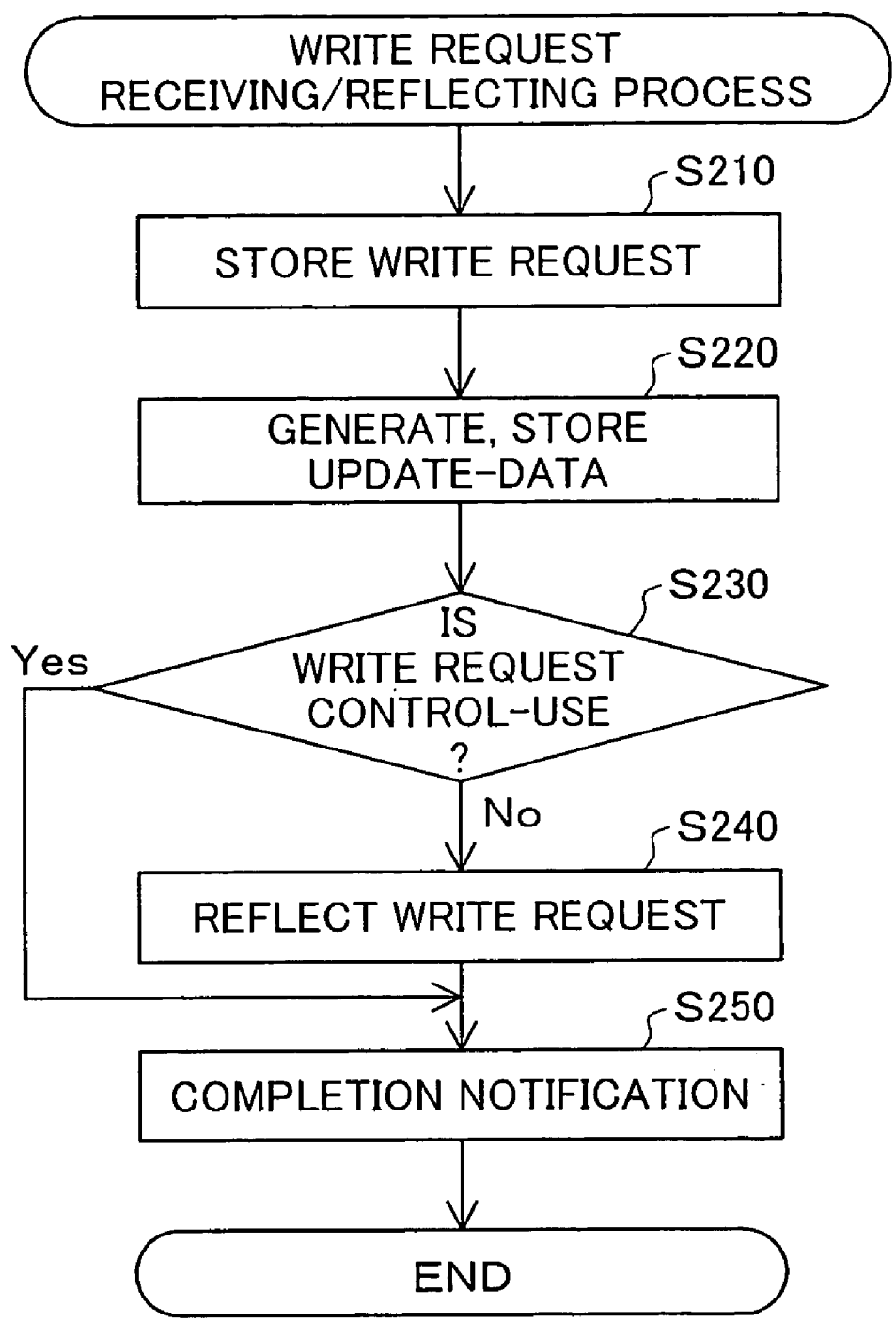
FIG. 11 is a flowchart showing the flow of a write request receiving/reflecting process by a primary storage subsystem.

A-3. Write Request Receiving/Reflecting Process:

FIG. 11 is a flowchart showing the flow of a write request receiving/reflecting process by a primary storage subsystem. The write request receiving/reflecting process is a process whereby a primary storage subsystem 100P having received a write request issued by primary host computer 10P (FIG. 1) reflects the write request in volume 122, as well as generating update-data for transferring the write request to a secondary storage subsystem 100R. The write request receiving/reflecting process is carried out by means of execution of the write request receiving/reflecting/transmitting program 130 by the primary storage subsystem 100P. Write requests issued by primary host computer 10P herein are considered to include both normal write requests and control-use write requests.

In Step S210, write request receiver 132 (FIG. 1) receives the write request issued by primary host computer 10P, and stores (reflects) the received write request in a predetermined area in cache memory 112P.

In Step S220 (FIG. 11), update-data generator 136 (FIG. 1) generates update-data on the basis of the write request stored in Step S210, and stores this in a predetermined area in cache memory 112P. Here, update-data consists of a copy destination volume identifier appended to the write request. Accordingly, the update-data will include the entire contents of the original write request. The copy destination volume identifier identifies a volume 122 (hereinafter termed a copy destination volume) that constitutes a copy pair together with the volume 122 identified by the write volume identifier contained in the write request. As noted, there are two types of write requests, namely, normal write requests and control-use write requests; accordingly, there are two types of update-data as well, i.e. normal update-data and control-use update-data.

In Step S230 (FIG. 11), the write request reflector 134 (FIG. 1) decides whether the write request stored in Step S210 is for control-use. The decision can be made by determining whether the write request contains a control-use identifier indicating that it is for control-use. If in Step S230 the request is decided to be for control-use, since there is no need for the write request to be reflected in volume 122, the routine moves on to Step S250, skipping Step S240. If on the other hand it is decided that the request is not for control-use, the routine advances to Step S240.

In Step S240 (FIG. 11), the write request reflector 134 reflects the write request in volume 122. Reflection of the write request in volume 122 is carried out by placing the write data contained in the write request at the write location in volume 122 specified by the write volume identifier and write data location contained in the write request. By so doing, writing of data to volume 122 is executed in accordance with the normal write request. In Step S250, write request receiver 132 presents completion notification to the primary host computer 10P.

In the above manner, primary storage subsystem 100P receives a write request, generates/stores update-data, and reflects the write request in volume 122. Before the transfer of update-data to secondary storage subsystem 100R described later, the primary host computer 10P is notified of completion. It is therefore possible to control degradation in performance due to larger distances among storage subsystems 100.

Figure 12:
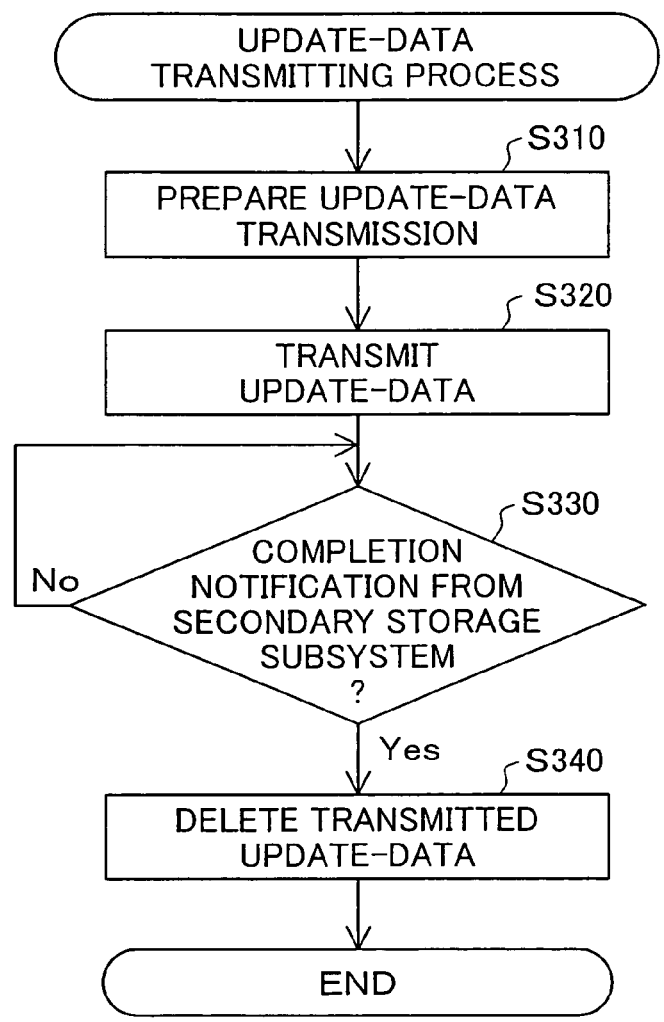
FIG. 12 is a flowchart showing the flow of an update-data transmitting process by a primary storage subsystem.

A-4. Update-Data Transmitting Process:

FIG. 12 is a flowchart showing the flow of an update-data transmitting process by a primary storage subsystem. The update-data transmitting process is a process for transmitting to secondary storage subsystem 100R update-data that has been stored in cache memory 112P of the primary storage subsystem 100P in the write request receiving/reflecting process described previously. The update-data transmitting process is carried out by means of primary storage subsystem 100P executing the write request receiving/reflecting/transmitting program 130.

In Step S310 (FIG. 12), the update-data transmitter 138 (FIG. 1) carries out preparation to transmit update-data. Transmission of update-data is carried out at a predetermined cycle, for example. In this case, the update-data transmitter 138, by way of preparation to transmit update-data, awaits the next transmission time. Transmission of update-data can also be carried out when, for example, a predetermined number of sets of update-data is held in cache memory 112P. In this case, the update-data transmitter 138, by way of preparation to transmit update-data, waits until the predetermined number of sets of update-data is held in cache memory 112P.

In Step S320 (FIG. 12), update-data transmitter 138 transmits the update-data held in cache memory 112P to the secondary storage subsystem 100R having the copy destination volume. Transmission of update-data is carried out targeting one or several sets of update-data stored in cache memory 112P. Transmission of update-data is carried out in order from the earliest issue time included in update-data.

In Step S330, update-data transmitter 138 decides whether completion notification has been received from the secondary storage subsystem 100R to which the update-data was transmitted. In Step S330, if it is decided that there has been no completion notification, it returns to Step S330 and awaits a completion notification. On the other hand, if in Step S330 it is decided that there has been completion notification, it proceeds to Step S340.

In Step S340, update-data transmitter 138 decides deletes the transmitted update-data from cache memory 112P. It then returns to Step S310 and repeats the preceding process.

In this way, primary storage subsystem 100P transmits update-data to secondary storage subsystem 100R, in order from the earliest issue time.

Figure 13:
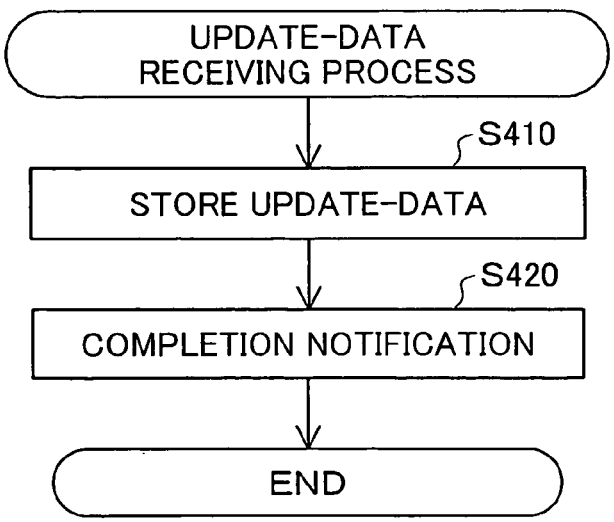
FIG. 13 is a flowchart showing the flow of an update-data receiving process by a secondary storage subsystem.

A-5. Update-Data Receiving Process:

FIG. 13 is a flowchart showing the flow of an update-data receiving process by a secondary storage subsystem. The update-data receiving process is carried out by execution of the update-data receiving/reflecting program 150 by the secondary storage subsystem 100R that has received update-data transmitted by primary storage subsystem 100P.

In Step S410, the update-data receiver 152 (FIG. 1) of secondary storage subsystem 100R receives update-data transmitted by primary storage subsystem 100P and stores it in a predetermined area in cache memory 112R. In Step S420, the update-data receiver 152 presents completion notification to primary storage subsystem 100P.

In this way, secondary storage subsystem 100R stores update-data in cache memory 112R.

Figure 14:
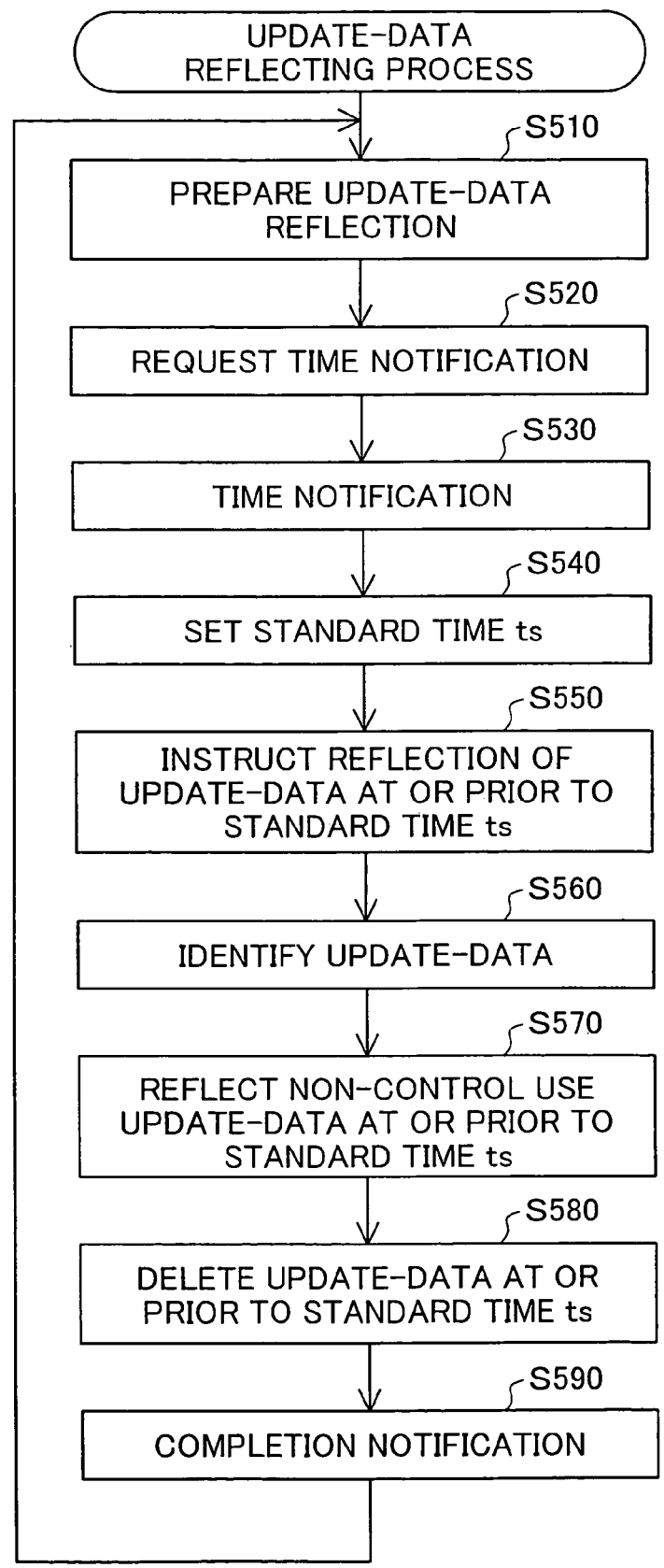
FIG. 14 is a flowchart showing the flow of an update-data reflecting process.
Figure 15A:
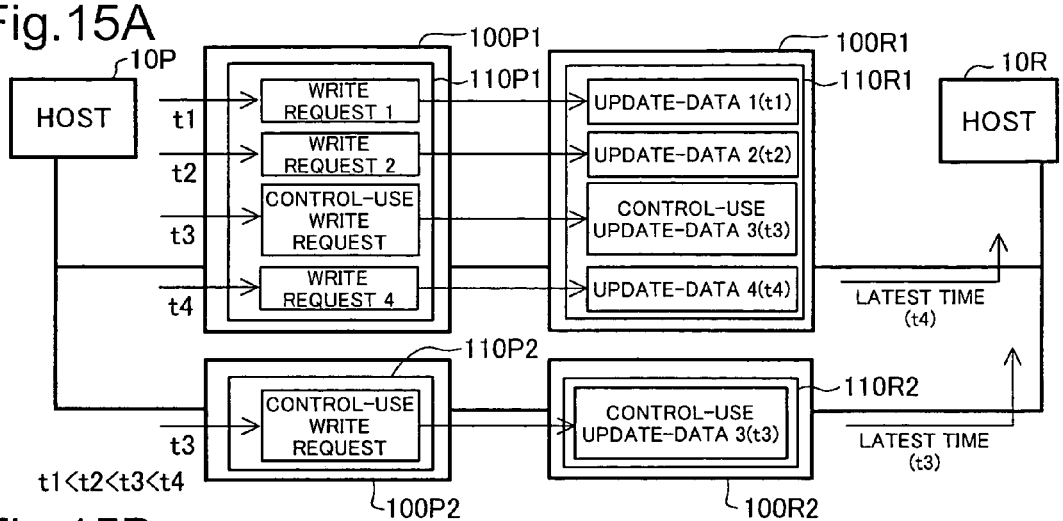
FIGS. 15A–15C illustrate the contents of an update-data reflecting process.
Figure 15B:
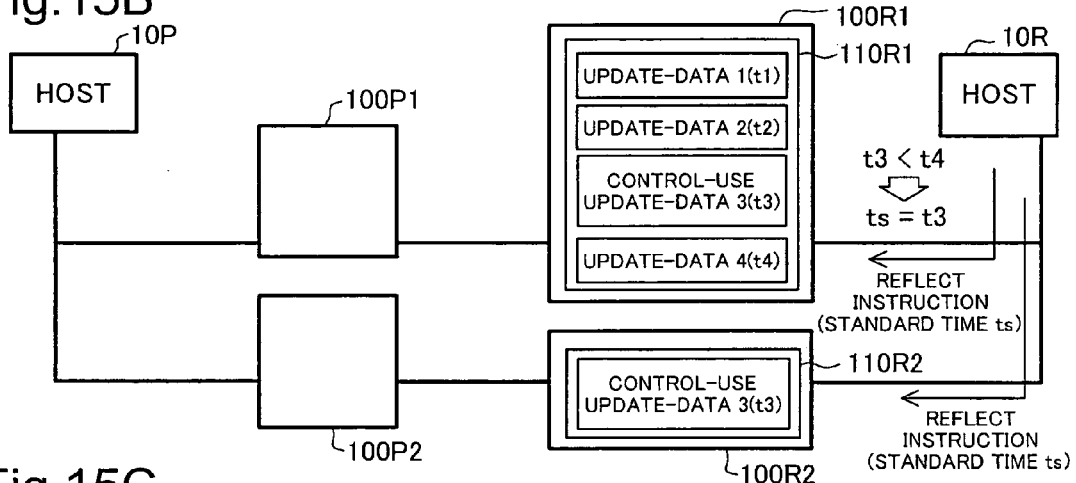
Figure 15C:
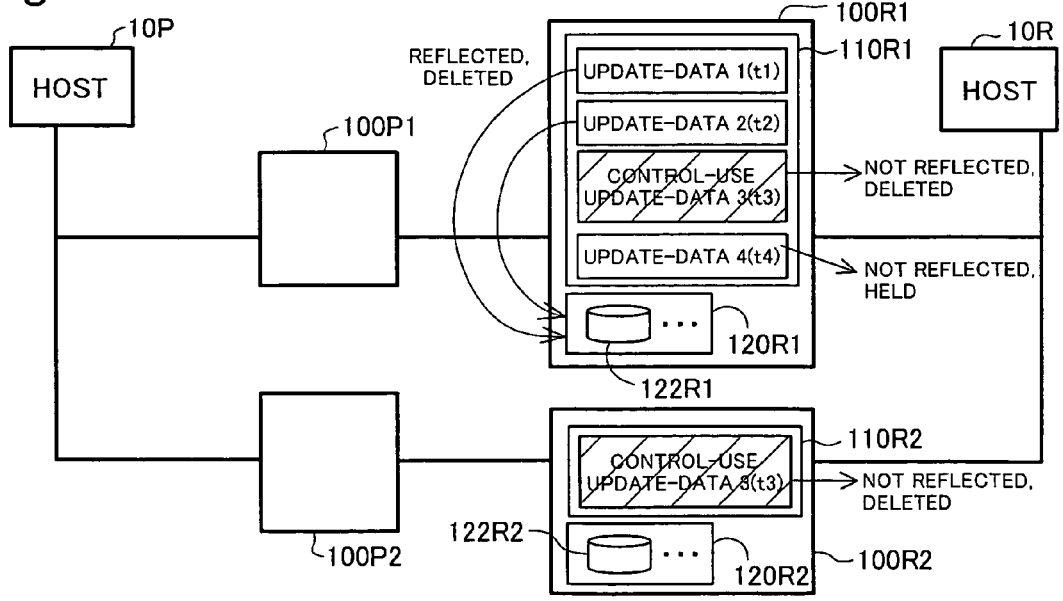

A-6. Update-Data Reflecting Process:

FIG. 14 is a flowchart showing the flow of an update-data reflecting process. FIGS. 15A–15C illustrate the contents of an update-data reflecting process. The update-data reflecting process is a process for reflecting update-data stored in secondary storage subsystem 100R (FIG. 1), in a volume 122 within secondary storage subsystem 100R. The update-data reflecting process is carried out by execution of the update-data receiving/reflecting program 150 and the update-data reflect instruction program 50 by secondary storage subsystem 100R and the secondary host computer 10R connected to secondary storage subsystem 100R.

In FIGS. 15A–15C is shown an example of an update-data reflecting process targeted to the extended copy group EGr-1 depicted in FIG. 8A. In FIG. 15A is shown a state in which a write request has been issued by primary host computer 10P to a primary storage subsystem 100P, update-data generated by the primary storage subsystem 100P receiving the write request has been transmitted to a secondary storage subsystem 100R, and secondary storage subsystem 100R has stored the transmitted update-data in cache memory 112R, not shown. In the drawing, tn denotes the write request issue time, with the value of n being smaller the earlier the issue time. That is, t1 is the earliest time, and t4 is the latest time. In the example of FIGS. 15A–15C, both a normal write request and a control-use write request have issued to primary storage subsystem 100P1 at top in FIG. 15A, whereas a normal write request has not been issued to primary storage subsystem 100P2 at bottom in FIG. 15A, only a control-use write request having been issued.

In Step S510 (FIG. 14), the reflect instructor 56 (FIG. 1) of secondary host computer 10R carries out preparation to reflect update-data. Reflection of update-data is carried out at a predetermined cycle, for example. In this case, the reflect instructor 56, by way of preparation to reflect update-data, awaits the next reflection time. Reflection of update-data can also be carried out when, for example, a predetermined number of sets of update-data is held in cache memory 112R. In this case, the reflect instructor 56, by way of preparation to reflect update-data, waits until the predetermined number of sets of update-data is held in cache memory 112R. The reflect instructor 56, by means of querying the storage controller unit 110R of secondary storage subsystem 100 for example, may ascertain update-data storage status in cache memory 112R.

In Step S520 (FIG. 14), the time acquirer 52 (FIG. 1) of secondary host computer 10R requests secondary storage subsystem 100R to notify it of the latest time among the issue times included in the stored update-data.

In Step S530 (FIG. 14), the time reporter 154 (FIG. 1) of secondary storage subsystem 100R detects the latest time among the stored update-data issue times, and notifies the secondary host computer 10R. In the example of FIG. 15A, t4 is the latest time among update-data issue times stored in the top secondary storage subsystem 100R1, and t3 is the latest time among update-data issue times stored in the bottom secondary storage subsystem 100R2. Accordingly, as shown in FIG. 15A, secondary host computer 10R is notified of t4 as the latest time for secondary storage subsystem 100R1 and t3 as the latest time for secondary storage subsystem 100R2.

In Step S540 (FIG. 14), the standard time setting module 54 (FIG. 1) of secondary host computer 10R sets a standard time ts on the basis of the latest times reported by secondary storage subsystems 100R. Setting of standard time ts is carried out by selecting for use as the standard time ts the earliest time among the latest times reported by secondary storage subsystems 100R. In the example of FIGS. 15A–15C, the latest times reported by secondary storage subsystems 100R are t4 and t3. Accordingly, as shown in FIG. 15B, t3, which is the earliest time among the latest times, is selected as the standard time ts.

In Step S550 (FIG. 14), the reflect instructor 56 (FIG. 1) of secondary host computer 10R instructs the secondary storage subsystem 100R so as to reflect update-data whose issue time is at or prior to standard time ts to be reflected in volume 122. In FIG. 15B depicts a reflect instruction by the reflect instructor 56 (not shown) to secondary storage subsystem 100R.

In Step S560 (FIG. 14), the update-data reflector 156 (FIG. 1) of secondary storage subsystem 100R, targeting update-data whose issue time is prior to standard time ts, identifies whether the update-data is for control-use. This identification can be made on the basis of whether a control-use identifier is contained in the update-data. In the example of FIGS. 15A–15C, since the standard time ts is t3, update-data whose issue time is at or prior to t3 is targeted for identification. In FIG. 15C, update-data determined by identification to be control-use is shown with hatching.

In Step S570 (FIG. 14), the update-data reflector 156 of secondary storage subsystem 100R reflects in volume 122 that update-data whose issue time is at or prior to standard time ts, and that is not control-use update-data. This reflection of update-data in volume 122 is carried out by storing the write data contained in the update-data in the volume 122 specified by the copy destination volume identifier. FIG. 15C depicts a state in which the update-data reflector 156 (not shown) of secondary storage subsystem 100R1 has reflected in volume 122 update-data 1 and update-data 2, which represent update-data whose issue time is at or prior to standard time ts and that is not control-use update-data. Since update-data 4 is update-data whose issue time is later than standard time ts, it is not reflected in volume 122. Secondary storage subsystem 100R2 contains no update-data targeted for reflection in volume 122.

In Step S580 (FIG. 14), the update-data reflector 156 of secondary storage subsystem 100R deletes any stored update-data whose issue time is at or prior to standard time ts. In the example of FIG. 15C, update-data whose issue time is at or prior to standard time ts includes update-data 1, update-data 2, and the control-use update-data. Accordingly, update-data 1, update-data 2, and the control-use update-data is deleted. Update-data 4, having an issue time subsequent to standard time ts, is not deleted but rather held in cache memory 112R to be reflected in volume 122 in response to some subsequent reflect instruction.

In Step S590 (FIG. 14), the update-data reflector 156 of secondary storage subsystem 100R provides completion notification to the secondary host computer 10R. It then returns to Step S510 and repeats the above process.

In this way, secondary storage subsystem 100R (FIG. 1) reflects update-data in volume 122 in accordance with a reflect instruction from secondary host computer 10R. In this case, secondary storage subsystem 100R reflects in volume 122 that stored update-data whose issue time is at or prior to standard time ts, while holding, but not reflecting in volume 122, update-data whose issue time is subsequent to standard time ts. Accordingly, in the computer system 1000 of this embodiment, it is possible to prevent situations in which an intermediate result of a transaction is left uncompleted.

Consider now a case where, in the example of FIGS. 15A–15C, the primary host computer 10P does not issue a control-use write request. In this instance, three write requests (write requests 1, 2, 4) would be issued to primary storage subsystem 100P1, but no write request would be issued to primary storage subsystem 100P2. Thus, whereas three sets of update-data (update-data 1, 2, 4) transmitted from primary storage subsystem 100P1 would be stored in secondary storage subsystem 100R1, no update-data would be sorted in secondary storage subsystem 100R2. Under such a condition, in Step S520 of FIG. 14, when a time notification request is made by secondary host computer 10R, secondary storage subsystem 100R1 would report the latest time (t4) (Step S530), whereas secondary storage subsystem 100R2 would not be able to report a latest time. Accordingly, secondary host computer 10R would not be able to proceed to setting standard time in Step S540 of FIG. 14, and would await reporting of latest time by secondary storage subsystem 100R2. Secondary storage subsystem 100R2 would only be able to carry out reporting of latest time after a subsequent point in time, once another write request has been made by primary host computer 10P to primary storage subsystem 100P2, and update-data transmitted from primary storage subsystem 100P2 has been stored in secondary storage subsystem 100R2. During this interval, secondary storage subsystem 100R2 would wait to reflect stored update-data in volume 122. Thus, if a condition persists in which update-data is not stored in any of the secondary storage subsystems 100R within an extended copy group, there is a risk of a delay in update-data stored in other secondary storage subsystems 100R being reflected in volume 122.

With the computer system 1000 of this embodiment, primary host computer 10P issues control-use write requests according to an issue cycle specified in the control-use write request issuing information 40 (FIG. 9). In issuing a control-use write request, one volume 122 is selected for each secondary storage subsystem 100R included in an extended copy group, and a control-use write request is issued to a specific volume 122 in the primary storage subsystem 100P that forms a copy pair with the selected volume 122. Thus, a condition in which the absence of any stored update-data persists for an extended period in any of the secondary storage subsystems 100R in an extended copy group can be prevented. Accordingly, delays in update-data stored in secondary storage subsystems 100R being reflected in volumes 122 can be avoided.

As described above, with the computer system 1000 of this embodiment, it is possible to control degradation in performance due to larger distances among storage subsystems 100, while at the same time preventing intermediate results of transactions from being left uncompleted in a computer system composed of a number of secondary storage subsystems 100R. Additionally, delays in update-data stored in secondary storage subsystems 100R being reflected in volumes 122 can be avoided.

Figure 16:
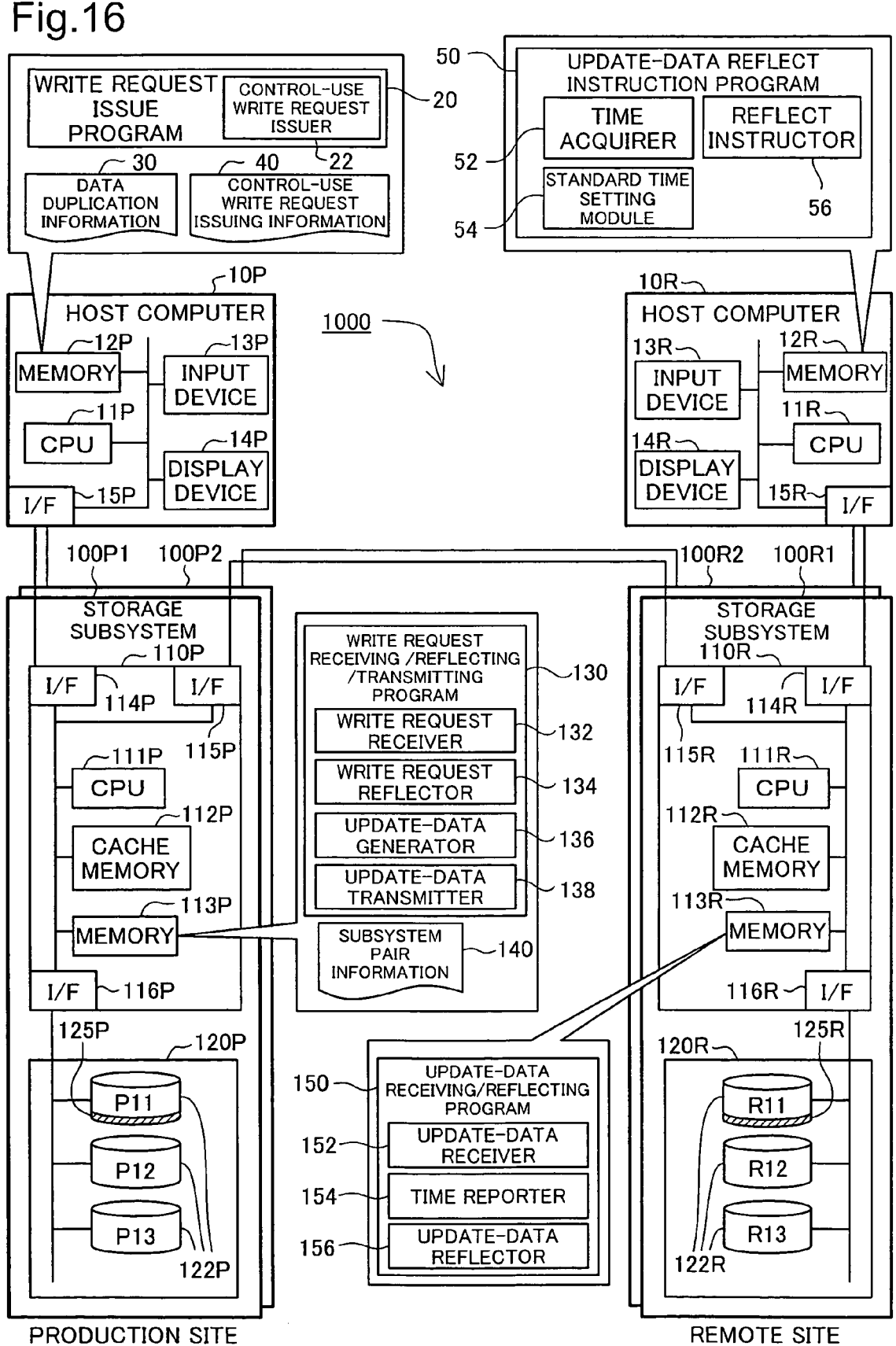
FIG. 16 is a block diagram showing arrangement of a computer system in Embodiment 2 of the invention.

B. Embodiment 2:

FIG. 16 is a block diagram showing arrangement of a computer system in Embodiment 2 of the invention. A difference from Embodiment 1 shown in FIG. 1 is that some of the volumes 122 housed in storage subsystems 100 are provided with a control-use data storing area 125. Other aspects are the same as Embodiment 1.

In Embodiment 2, as in Embodiment 1, control-use write requests are issued by primary host computer 10P to primary storage subsystems 100P. In the same way as in Embodiment 1, issued control-use write requests are stored in primary storage subsystems 100P as well as being transmitted as control-use update-data to secondary storage subsystems 100R, and reflected in secondary storage subsystems 100R.

In Embodiment 2, in contrast to Embodiment 1, control-use write requests stored in primary storage subsystems 100P and control-use update-data stored in secondary storage subsystems 100R are reflected in volumes 122. That is, primary host computer 10P issues control-use write requests specifying write data locations such that write data included in a control-use write request (or control-use update-data) is reflected in the control-use data storing area 125 provided in volume 122.

By so doing, it becomes acceptable for the write request reflector 134 of primary storage subsystems 100P to reflect all write requests in volumes 122, thus eliminating the need to distinguish whether a write request is for control-use. Similarly, update-data reflector 156 of secondary storage subsystems 100R need not distinguish whether update-data is for control-use. Accordingly, in Embodiment 2, there is no need to include a control-use identifier in control-use write requests. Also, it is possible to dispense with the step of identifying write requests and update-data.

The control-use data storing area 125 may be provided to all target primary volumes and target secondary volumes described in FIG. 10. Control-use write requests are issued specifying target primary volumes.

In the above manner, with the computer system 1000 of Embodiment 2, as in Embodiment 1, it is possible to control degradation in performance due to larger distances among storage subsystems 100, while at the same time preventing intermediate results of transactions from being left uncompleted in a computer system composed of a number of secondary storage subsystems 100R. Additionally, delays in update-data stored in secondary storage subsystems 100R being reflected in volumes 122 can be avoided. Furthermore, the need to include a control-use identifier in control-use write requests is eliminated, and it is possible to dispense with the step of identifying write requests and update-data.

C. Variations

The invention is not limited to the embodiments set forth hereinabove, and may be reduced to practice in various modes without departing from the scope and spirit thereof The following variations are possible, for example.

C1. Variation 1:

The configuration of computer system 1000 in the preceding embodiments is merely exemplary, with various other configurations of the computer system 1000 being possible. For example, in the preceding embodiments, computer system 1000 is composed of two sites, namely, a production site and a remote site; however, computer system 1000 may instead be composed of a single site, or three or more sites.

Furthermore, whereas in the preceding embodiments, primary storage subsystems 100P and secondary storage subsystems 100R are provided in sets of two each, it is acceptable for computer system 1000 to have two or more secondary storage subsystems 100R, with the number of primary storage subsystems 100P being arbitrary.

Figure 17:
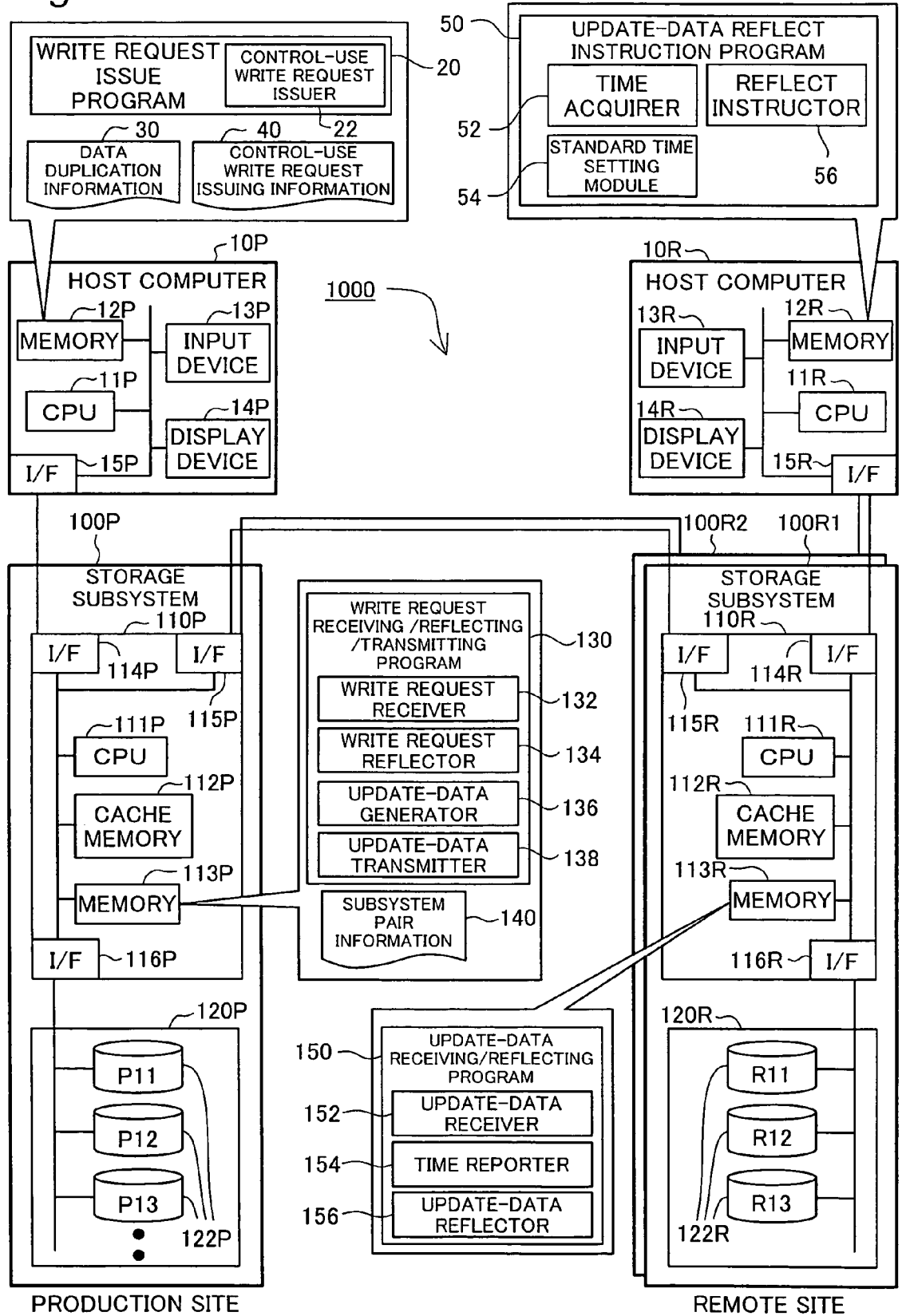
FIG. 17 is a block diagram showing arrangement of a computer system in a variation of the invention.
Figure 18:
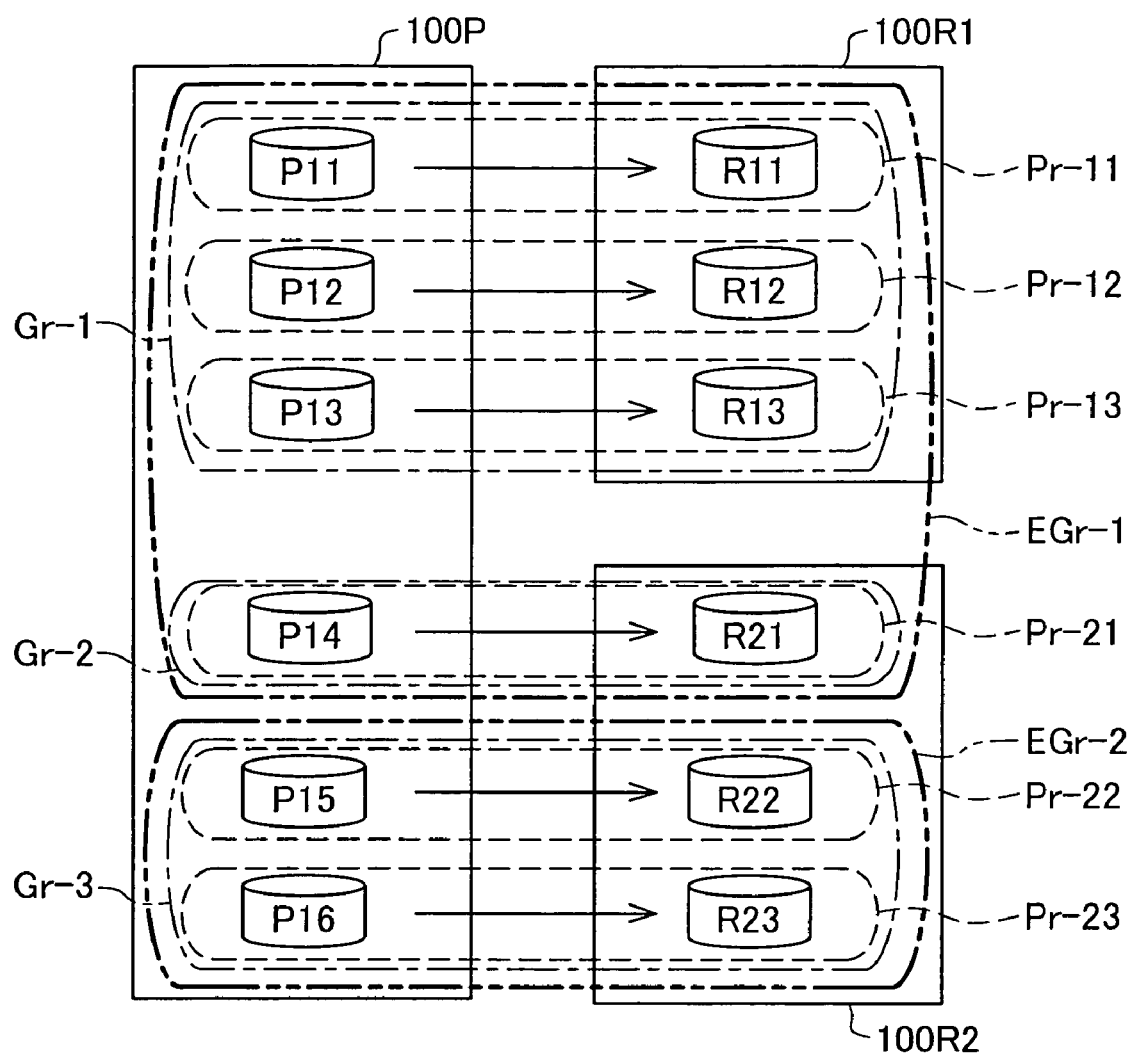
FIG. 18 is an illustration of data duplication settings in a computer system in a variation of the invention.

FIG. 17 is a block diagram showing arrangement of a computer system in a variation of the invention. FIG. 18 is an illustration of data duplication settings in a computer system in a variation of the invention. As shown in FIG. 17, this variation differs from Embodiment 1 shown in FIG. 1 in that the number of installed primary storage subsystems 100P is one, but in other respects is the same as Embodiment 1. As shown in FIG. 18, data duplication setting conditions in the computer system of this variation differ from those of Embodiment 1 shown in FIG. 8B only in that there is a single primary storage subsystem 100P. In this case, as in Embodiment 1, one volume 122 is selected for each secondary storage subsystem 100R included in an extended copy group, and a control-use write request is issued to a specific volume 122 in the primary storage subsystem 100P that forms a copy pair with the selected volume 122. Accordingly, control-use write requests targeted to extended copy group EGr-1 shown in FIG. 18, for example, includes two requests issued to primary storage subsystem 100P, namely, a control-use write request specifying the P11 volume and a control-use write request specifying the P14 volume. Control-use update-data is transmitted from primary storage subsystem 100P to the two secondary storage subsystems 100R (100R1 and 100R2).

C2. Variation 2:

The contents of the data duplication information 30 used in the preceding embodiments (including the system configuration information 32, system pair information 34, system group information 36, and system extended group information 38), of the control-use write request issuing information 40, and of the subsystem pair information 140 (hereinafter referred as "each information set") are merely exemplary, it being possible for each information set to include other contents, or to omit some of the contents of each information set indicated in the embodiments.

C3. Variation 3:

The contents of the write request and update-data used in the preceding embodiments are merely exemplary, it being possible for these to include other contents, or to omit some of the contents indicated in the working examples.

C4. Variation 4:

In the preceding embodiments, the update-data reflecting process involves the secondary host computer 10R reporting to a secondary storage subsystem 100R the latest time from among issue times contained in stored update-data, with the secondary storage subsystem 100R establishing as a standard time ts the earliest time among the latest times reported to it; however, it is possible instead to establish standard time ts by some other method. For example, the secondary host computer 10R may report any single issue time among issue times contained in stored update-data, and the secondary storage subsystem 100R may then establish as a standard time ts the earliest time among the times reported to it. Alternatively, the secondary host computer 10R may report issue times contained in all stored update-data, and the secondary storage subsystem 100R may then extract the latest time from among reported times for each secondary host computer 10R, and establish as a standard time ts the earliest time among the latest times so extracted.

C5. Variation 5:

In the preceding embodiments, an issue cycle for control-use write requests is established for each individual extended copy group; however, it is possible to establish control-use write request issue cycles according to some other unit-by-unit basis. For example, control-use write request issue cycles may be established on a copy group-by-copy group basis. Alternatively, a single unvarying setting may be employed for all control-use write request issue cycles.

C6. Variation 6:

In the control-use write request issue process in Embodiment 1, as shown in FIG. 10, once a single control-use write request has been issued (Step S150), the process stands by until the next issue time (Step S170), whereupon the process then subsequently returns to identification of secondary storage subsystems 100R (Step S120); however, it is not necessary to return to Step S120 at this point. For example, where there is issued a subsequent control-use write request that identifies as the target primary volume the same volume as the previous control-use write request, since there is no need to again execute Steps S120 through S140 in FIG. 10, it is possible for the process to instead, after completing Step S170, to return to Step S150 and issue a control-use write request again identifying the same target primary volume.

C7. Variation 7:

In the preceding embodiments, a control-use write request is issued identifying a target primary volume housed in a primary storage subsystem 100P, but this need not necessarily be the case. For example, a dummy volume 122 may be established within primary storage subsystem 100P, a dummy volume 122 constituting a dummy copy pair with the former dummy volume 122 established within secondary storage subsystem 100R, and write requests issued identifying the dummy volume established in primary storage subsystem 100P. In this case, where a control-use write request identifies the dummy volume 122, it will be decided in the primary storage subsystem 100P and secondary storage subsystems 100R that the write request is a control-use write request, and no process to reflect it in a logically existing volume 122 will be executed.

C8. Variation 8:

In the preceding embodiments, the update-data transmitter 138 transmits update-data to secondary storage subsystems 100R in the order of earliest issue time included in the update-data; however, transfer of update-data may instead be carried out according to the order in which the write requests which are the basis of the transmitted update-data were issued. For example, update-data generator 136 may assign sequential numbers to update-data according to the order in which the write requests which are the basis therefor were issued, and the update-data transmitter 138 may then transmit update-data regardless of issue time chronology. In this case, it is nevertheless possible for update-data receiver 152 to determine, from the sequential numbers assigned to received update-data, the order in which the write requests on which they are based were issued. Thus, in the event of a break in the sequence of numbers assigned to received update-data, the update-data receiver 152 may be able to determine that update-data assigned the missing number has yet to be received. In this case, in the update-data reflecting process, time reporter 154 will exclude received update-data which, of the received update-data, has assigned thereto sequential numbers greater than the sequential number of the unreceived update-data, when detecting and reporting the latest time.

According to the embodiments set forth hereinabove, it is now possible to control degradation in performance due to larger distances among storage subsystems, while at the same time preventing intermediate results of transactions from being left uncompleted in a computer system composed of a plurality of secondary storage subsystems.

Although the present invention has been described and illustrated in detail, it is clearly understood that the same is by way of illustration and example only and is not to be taken by way of limitation, the spirit and scope of the present invention being limited only by the terms of the appended claims.

Finally, the present application claims the priority based on Japanese Patent Application No.2004-146038 filed on May 17, 2004, which is herein incorporated by reference.

What is claimed is:

1. A computer system comprising:
   a first and second computer;
   at least one first storage system connected to the first computer; and
   a plurality of second storage systems connected to the second computer as well as being connected to the at least one first storage system,
   wherein the at least one first storage system and the plurality of second storage systems each comprises at least N storage areas for storing data, N being an integer equal to 2 or greater, and
   there is established N copy pair composed of one storage area in the at least one first storage system and one storage area in the plurality of second storage systems,
   wherein the first computer comprises:
      a write request issue module configured to issue a write request to the at least one first storage system, the write request being stamped with an issue time, the write request containing information indicating a storage area in the at least one first storage system, the write request being one of a normal write request and a control-use write request, the normal write request requesting that data be written to the indicated storage area, the control-use write request being issued at predetermined periodic intervals,
   the first storage system comprises:
      a write request receiver configured to receive the issued write request;
      a write request reflector configured to execute a process requested by the received write request; and
      an update-data transmitter configured to transmit the received write request, as update-data, to the second storage system having a storage area that constitutes a copy pair with the storage area in the at least one first storage system indicated by the received write request, in such a way that the order in which the write requests are issued is ascertainable,
   the second storage system comprises:
      an update-data receiver configured to receive the transmitted update-data; and an update-data reflector configured to execute a process requested by the received update-data, responsive to an execute instruction from the second computer, and the second computer comprises:
- a time acquirer configured to acquire from the plurality of second storage systems the issue time stamped on the update-data received by the plurality of second storage systems;
- a standard time setting module configured to set a standard time on the basis of the acquired issue time; and
- an execute instructor configured to instruct the plurality of second storage systems to execute a process requested by the update-data that, of the update-data received by the plurality of second storage systems, is stamped with the issue time that is at or prior to the standard time.

2. A computer system according to claim 1, wherein the write request receiver of the first storage system, upon receiving the write request, provides notification of completed reception to the first computer.

3. A computer system according to claim 1, wherein the control-use write request includes a predetermined identifier indicating that the write request is for control-use, and the write request reflector of the first storage system and the update-data reflector of the second storage system do not execute writing of data to the storage area if the received write request or the received update-data is for control-use, and execute writing of data to the storage area if the received write request or the received update-data is a normal write request or a normal update-data.

4. A computer system according to claim 1, wherein there is established at least one extended copy group composed of a plurality of copy pairs that include, of the storage areas in the plurality of second storage systems, a plurality of storage areas on which is executed a process requested by the update-data using the same standard time, at least one storage area sewing as a target secondary storage area is established for each second storage system having the storage area included in the copy pair that makes up the extended copy group, the storage area in the first storage system making up the copy pair together with the target secondary storage area is established as a target primary storage area, and the write request issue module issues the control-use write request indicating the target primary storage area.

5. A computer system according to claim 4, wherein the standard time setting module sets the standard time for each individual extended copy group.

6. A computer system according to claim 5, wherein the standard time setting module, for each individual second storage system having the storage area included in the copy pair that makes up the extended copy group, acquires latest time from the issue time stamped on the update-data, for use as system latest time, and establishes the earliest time among the system latest times, as the standard time for the extended copy group.

7. A computer system according to claim 4, wherein the target primary storage area and the target secondary storage area have a control-use data storing area for storing write data contained in the control-use write request.

8. A computer system according to claim 1, wherein there is established at least one extended copy group composed of a plurality of copy pairs that include, of the storage areas in the plurality of second storage systems, a plurality of storage areas on which is executed a process requested by the update-data using the same standard time, a dummy secondary storage area is established for each second storage system having the storage area included in the copy pair that makes up the extended copy group, a dummy primary storage area forming a dummy copy pair with the dummy secondary storage area is established in the first storage system tat has the storage area included in the copy pair making up the extended copy group, and the write request issue module issues the control-use write request indicating the dummy primary storage area.

9. A computer system according to claim 1, wherein the update-data reflector, among update-data whose issue time is at or prior to the standard time, deletes any normal update-data alter executing the process requested by the update-data, and deletes any control-use update-data without executing the process requested by the update-data.

10. A write request processing method in a computer system that comprises at least one first storage system connected to a first computer and a plurality of second storage system connected to a second computer as well as being connected to the at least one first storage system, the at least one first storage system and the plurality of second storage systems each comprising at least N storage areas for storing data, N being an integer equal to 2 or greater, there being established N copy pairs composed of one storage area in the at least one first storage system and one storage area in the plurality of second storage systems, the method comprising the steps of:

(a) issuing from the first computer a write request to the at least one first storage system, the write request being stamped with an issue time, the write request containing information indicating a storage area in the at least one first storage system, the write request being one of a normal write request and a control-use write request the normal write request requesting that data be written to the indicated storage area, the control-use write request being issued at predetermined periodic intervals;

(b) receiving the issued write request by the first storage system;

(c) executing a process requested by the received write request by the first storage system;

(d) transmitting from the first storage system the received write request as update-data, to the second storage system having a storage area that constitutes a copy pair with the storage area in the at least one first storage system indicated by the received write request;

(e) receiving the transmitted update-data by the second storage system;

(f) executing a process requested by the received update-data by the second storage system, responsive to an execute instruction from the second computer;

(g) acquiring by the second computer from the plurality of second storage systems the issue time stamped on the update-data received by the plurality of second storage systems;

(h) setting a standard time on the basis of the acquired issue time by the second computer; and (i) instructing by the second computer the plurality of second storage systems to execute a process requested by the update-data that, of the update-data received by the plurality of second storage systems, has appended thereto issue time that is at or prior to the standard time.

11. A second storage system adaptable in a computer system that includes at least one first storage system comprising at least N storage areas for storing data, N being an integer equal to 2 or greater, and a first computer connected to the first storage system, the second storage system comprising:

an update-data receiver an update-data reflector; and

N storage areas for storing data, N being an integer equal to 2 or greater, wherein there is established N copy pairs composed of one storage area in the at least one first storage system and one storage area in the plurality of second storage systems, the update-data receiver of the second storage system receives a write request as update-data, the write request being issued byte first computer to the at least one first storage system, the write request being stamped with an issue time, the write request containing information indicating a storage area in the at least one first storage system, the write request being one of a normal write request and a control-use write request, the normal write request requesting that data be written to the indicated storage area, the control-use write request being issued at predetermined periodic intervals, the issued write request being received by the first storage system, the received write request being transmitted by the first storage system, as the update-data, to the second storage system having a storage area that constitutes a copy pair with the storage area in the at least one first storage system indicated by the received write request, in such a way that the order in which the write requests are issued is ascertainable; and the update-data reflector of the second storage system executes execution, responsive to an execute instruction from a second computer connected to the second storage system, of the process requested by the received update-data stamped with issue time that is at or prior to a standard time that has been established on the basis of issued time stamped on update-data received by the plurality of second storage systems.

12. A second storage system according to claim 11, wherein the first storage system, upon receiving the write request, provides notification of completed reception to the first computer.

13. A second storage system according to claim 11, wherein the control-use write request includes a predetermined identifier indicating that the write request is for control-use, and the update-data reflector of the second storage system does not execute writing of data to the storage area if the received update-data is for control-use, and executes writing of data to the storage area if the received update-data is a normal update-data.

14. A second storage system according to claim 11, wherein there is established at least one extended copy group composed of a plurality of copy pairs that include, of the storage areas in the plurality of second storage systems, a plurality of storage areas on which is executed a process requested by to update-data using the same standard time, at least one storage area serving as a target secondary storage area is established for each second storage system having the storage area included in the copy pair that makes up the extended copy group, the storage area in the first storage system making up the copy pair together with the target secondary storage area is established as a target primary storage area, and the update-data receiver of the second storage system receives the control-use write request as a control-use update-data from the first storage system, the control-use write request being issued by the first computer indicating the target primary storage area, the issued control-use write request being received by the first storage system, the received control-use write request being transmitted to the second storage system by the first storage system.

15. A second storage system according to claim 14, wherein the standard time is established for each individual extended copy group.

16. A second storage system according to claim 15, wherein the standard time for the extended copy group is the earliest time among system latest times, the system latest time being the latest time among the issue times stamped on the update-data, the update-data being received by the second storage system having the storage area included in the copy pair that makes up the extended copy group.

17. A second storage system according to claim 14, wherein the target secondary storage area has a control-use data storing area for storing write data contained in the control-use write request.

18. A second storage system according to claim 11, wherein there is established at least one extended copy group composed of a plurality of copy pairs that include, of the storage areas in the plurality of second storage systems, a plurality of storage areas on which is executed a process requested by the update-data using the same standard time, a dummy secondary storage area is established for each second storage system having the storage area included in the copy pair that makes up the extended copy group, a dummy primary storage area forming a dummy copy pair with the dummy secondary storage area is established in the first storage system that has the storage area included in the copy pair making up the extended copy group, and the update-data receiver of the second storage system receives the control-use write request as the control-use update-data from the first storage system, the write request being issued by the first computer indicating the dummy primary storage area, the issued control-use write request being received by the first storage system, the received control-use write request being transmitted to the second storage system by the first storage system.

19. A second storage system according to claim 11, wherein the update-data reflector, among update-data whose issue time is at or prior to the standard time, deletes any normal update-data after executing the process requested by the update-data, and deletes any control-use update-data without executing the process requested by the update-data.

20. A computer system comprising:

a first and second computer;

at least one first storage system connected to the first computer, the first storage system having a first storage controller unit and a first disk array; and a plurality of second storage systems connected to the second computer as well as being connected to the at least one first storage system, the second storage system having a second storage controller unit and a second disk array, wherein the first disk array belonging to the at least one first storage system and the second disk array belonging to the plurality of second storage systems each comprises at least N volumes for storing data, N being an integer equal to 2 or greater, there is established N copy pairs composed of one volume in the at least one first storage system and one volume in the plurality of second storage systems, there is established at least one extended copy group composed of a plurality of copy pairs, at least one volume serving as a target secondary volume is established for each second storage system having a volume included in a copy pair that makes up the extended copy group, and a volume in the first storage system making up a copy pair together with the target secondary volume is established as a target primary volume, wherein the first computer comprises:

a write request issue module configured to issue a write request to the at least one first storage system, the write request being stamped with an issue time, the write request containing information indicating the target primary volume in the at least one first storage system, the write request being one of a normal write request and a control-use write request the normal write request requesting that data be written to the indicated target primary volume, the control-use write request being issued at predetermined periodic intervals, the first storage controller unit of the first storage system comprises:

a write request receiver configured to receive the issued write request and to carry out reception complete notification to the first computer issuing the write request;

a write request reflector configured not to execute writing of data to a volume if the received write request is for control-use and to execute writing of data to a volume if the received write request is a normal write request; and an update-data transmitter configured to transmit the received write request, as update-data, to the second storage system having the target secondary volume that constitutes a copy pair with the target primary volume indicated by the received write request, in such a way that the order in which the write requests are issued is ascertainable, the second storage controller unit of the second storage system comprises:

an update-data receiver configured to receive the transmitted update-data and to carry out reception complete notification to the first storage system transmitting the update-data;

a time reporter configured to report the latest time among issue times stamped on the received update-data to the second computer; and an update-data reflector configured to determine whether the received update-data is a control-use update-data or a normal update-data and to delete the update-data without writing data to the volume if the update-data is for control-use or to delete the update-data after executing writing of data to the volume if the update-data is normal, responsive to an instruction from the second computer, and the second computer comprises:

a time acquirer configured to acquire from the plurality of second storage systems the latest issue time among issue time stamped on the update-data received by the plurality of second storage systems;

a standard time setting module configured, far each individual second storage system having the volume included in the copy pair that makes up the extended copy group, to acquire latest time from the issue time stamped on the update-data, for use as system latest time, and to establish the earliest time among the system latest times, as the standard time for the extended copy group; and an execute instructor configured to instruct the plurality of second storage systems baying the volume included in the copy pair that makes up the extended copy group to execute a process requested by the update-data that, of the update-data received by the plurality of second storage systems, is stamped with the issue time that is at or prior to the standard time.

* * * * *